(12) United States Patent
Kalukin

(10) Patent No.: US 10,628,743 B1
(45) Date of Patent: Apr. 21, 2020

(54) AUTOMATED ONTOLOGY SYSTEM

(71) Applicant: Andrew R. Kalukin, Arlington, VA (US)

(72) Inventor: Andrew R. Kalukin, Arlington, VA (US)

(*) Notice: Subject to any disclaimer, the term of this patent is extended or adjusted under 35 U.S.C. 154(b) by 0 days.

(21) Appl. No.: 16/256,089

(22) Filed: Jan. 24, 2019

(51) Int. Cl.
| | |
|---|---|
| *G06N 5/00* | (2006.01) |
| *G06F 17/27* | (2006.01) |
| *G06F 16/9032* | (2019.01) |
| *G06N 5/02* | (2006.01) |
| *G10L 15/22* | (2006.01) |
| *G06F 40/211* | (2020.01) |

(52) U.S. Cl.
CPC ....... *G06N 5/006* (2013.01); *G06F 16/90332* (2019.01); *G06F 40/211* (2020.01); *G06N 5/022* (2013.01); *G10L 15/22* (2013.01); *G10L 2015/225* (2013.01)

(58) Field of Classification Search
CPC .......................... G06F 17/2765; G06F 17/2785
See application file for complete search history.

(56) References Cited

U.S. PATENT DOCUMENTS

| | | | | |
|---|---|---|---|---|
| 5,794,050 A * | 8/1998 | Dahlgren | ............... | G06F 17/271 717/144 |
| 6,424,962 B1 * | 7/2002 | Billon | .................... | G06N 5/003 706/61 |
| 7,676,489 B2 * | 3/2010 | Kaiser | ................. | G06F 17/2785 707/999.102 |
| 7,685,088 B2 | 3/2010 | Zhang et al. | | |
| 7,725,307 B2 | 5/2010 | Bennett | | |
| 8,135,576 B2 | 3/2012 | Haley et al. | | |

(Continued)

FOREIGN PATENT DOCUMENTS

| | | |
|---|---|---|
| CN | 103116574 A | 5/2013 |
| CN | 103593335 A | 2/2014 |

(Continued)

OTHER PUBLICATIONS

Álvez, Javier, Paqui Lucio, and German Rigau. "Black-box testing of first-order logic ontologies using WordNet." arXiv preprint arXiv:1705.10217 (2017). (Year: 2017).*

(Continued)

*Primary Examiner* — Brian L Albertalli
(74) *Attorney, Agent, or Firm* — Maier & Maier, PLLC

(57) ABSTRACT

A robotic system for processing input, such as text data provided through a messaging system, spoken language data provided through a microphone, or any other such input data, which may function to process the input so as to be able to respond or reply to a user based on comprehension of the input sentences. An automated theorem prover (ATP) may operate as an underlying framework for the AI system that understands and responds to spoken or written statements translated into a proper format. An ATP formatter may be used to translate natural language processing (NLP) output from a NLP syntactical sentence parser into the proper format, such that the ATP system may be able to generate and populate an ontology from the NLP output. User queries may be mapped to this ontology in order to facilitate comprehension. If desired, the system may automatically populate the ontology through Internet searching.

20 Claims, 6 Drawing Sheets

(56) References Cited

U.S. PATENT DOCUMENTS

| | | | |
|---|---|---|---|
| 8,560,305 | B1 | 10/2013 | Georgiev |
| 8,689,192 | B2 | 4/2014 | Dargelas |
| 8,990,138 | B2* | 3/2015 | Shironoshita .......... G06N 5/006 706/45 |
| 9,063,923 | B2 | 6/2015 | Williams |
| 9,588,963 | B2 | 3/2017 | Williams et al. |
| 9,626,358 | B2 | 4/2017 | Danielyan |
| 10,108,600 | B2 | 10/2018 | Williams |
| 2005/0256700 | A1 | 11/2005 | Moldovan et al. |
| 2006/0053174 | A1* | 3/2006 | Gardner .............. G06F 21/6245 |
| 2011/0125734 | A1 | 5/2011 | Duboue et al. |
| 2011/0320187 | A1* | 12/2011 | Motik .................. G06F 17/278 704/9 |
| 2013/0124397 | A1* | 5/2013 | Fox ........................ G06Q 10/10 705/39 |
| 2016/0085743 | A1 | 3/2016 | Haley |
| 2016/0239562 | A1* | 8/2016 | Schilder .............. G06F 16/3344 |
| 2016/0335251 | A1 | 11/2016 | Georgiev |
| 2017/0046139 | A1* | 2/2017 | Yi .......................... G06F 17/271 |
| 2017/0103056 | A1 | 4/2017 | James, III et al. |
| 2017/0277680 | A1 | 9/2017 | Ajmera et al. |
| 2018/0052844 | A1 | 2/2018 | Seo et al. |
| 2018/0089171 | A1 | 3/2018 | Arquero et al. |
| 2018/0090143 | A1 | 3/2018 | Saddler et al. |
| 2018/0121545 | A1 | 5/2018 | Chen et al. |
| 2019/0220474 | A1 | 7/2019 | Williams et al. |
| 2019/0258717 | A1 | 8/2019 | Williams et al. |
| 2019/0294679 | A1 | 9/2019 | Grube |
| 2019/0325022 | A1 | 10/2019 | Williams et al. |
| 2019/0362145 | A1 | 11/2019 | Williams et al. |

FOREIGN PATENT DOCUMENTS

| | | |
|---|---|---|
| CN | 106155999 A | 11/2016 |
| CN | 107169043 A | 9/2017 |

OTHER PUBLICATIONS

Furbach, Ulrich, Ingo Glöckner, and Björn Pelzer. "An application of automated reasoning in natural language question answering." Ai Communications 23.2-3 (2010): 241-265. (Year: 2010).*

Akhmatova, Elena. "Textual entailment resolution via atomic propositions." Proceedings of the PASCAL Challenges Workshop on Recognising Textual Entailment. vol. 150. 2005. (Year: 2005).*

Blackburn, Patrick, et al. "Automated theorem proving for natural language understanding." Paper available at URL: http://www.uni-koblenz. de/~peter/cade-15-ws (1998). (Year: 1998).*

Bird, Steven, Ewan Klein, and Edward Loper. Natural language processing with Python: analyzing text with the natural language toolkit. "O'Reilly Media, Inc.", 2009. (Year: 2009).*

Blackburn, Patrick, Johan Bos, and Michael Kohlhase. "Automated reasoning for computational semantics." (1999). (Year: 1999).*

Blackburn, Patrick, et al. "Inference and computational semantics." Computing Meaning. Springer, Dordrecht, 2001. 11-28. (Year: 2001).*

Álvez, Javier, Paqui Lucio, and German Rigau. "Improving the competency of first-order ontologies." Proceedings of the 8th International Conference on Knowledge Capture. ACM, 2015. (Year: 2015).*

Fuenmayor, David. "Computational Hermeneutics: Using Automated Reasoning for the Logical Analysis of Natural-Language Arguments." RuleML+ RR (Supplement). 2018. (Year: 2018).*

Mazen Alobaidi, et al., "Automated ontology generation framework powered by linked biomedical ontologies for disease-drug domain", Computer Methods and Programs in Biomedicine, vol. 165, 2018, pp. 117-128 (12 pgs.).

Christopher Phillip Town, "Ontology based Visual Information Processing", a thesis, Trinity College, Dec. 2004, 256 pgs.

Rahmad Mehendra, et al., faculty of Computer Science, University of Indonesia, Depok 16424, Indonesia, "Extending an Indonesian Semantic Analysis-based Question Answering System with Linguistic and World Knowledge Axioms", 2008, 10 pgs.

Ehsan Darrudi, et al., "Human Plausible Reasoning for Question Answering Systems", International Conference on Advances in Intelligent Systems—Theory and Applications in cooperation with IEEE Computer Society—AISTA '2004, Luxembourg, Nov. 15-18, 2004, 8 pgs.

Ehsan Darrudi, et al., "TeLQAS: a realization of humanlike inferences for knowledge-based question answering", Journal of Computational Linguistics, 2005, 15 pgs.

Septina Dian Larasati, et al., "Towards a Semantic Analysis of Bahasa Indonesia for Question Answering", Proceedings of the 10th Conference of the Pacific Association for Computational Linguistics, Sep. 2007, pp. 273-280 (8 pgs.).

* cited by examiner

100

```
┌─────────────────────────────────────────────────────────────┐
│ Form knowledge domain through ontological engineering       │
│ 102                                                         │
└─────────────────────────────────────────────────────────────┘
                              ↓
┌─────────────────────────────────────────────────────────────┐
│ Ingest information from open sources                        │
│ 104                                                         │
└─────────────────────────────────────────────────────────────┘
                              ↓
┌─────────────────────────────────────────────────────────────┐
│ Transform ingested information into rule-based structures   │
│ 106                                                         │
└─────────────────────────────────────────────────────────────┘
                              ↓
┌─────────────────────────────────────────────────────────────┐
│ Perform conjecture generation                               │
│ 108                                                         │
└─────────────────────────────────────────────────────────────┘
                              ↓
┌─────────────────────────────────────────────────────────────┐
│ Perform hypothesis testing                                  │
│ 110                                                         │
└─────────────────────────────────────────────────────────────┘
```

Fig. 1

500 formulas(sos).

```
-parent(x,y) | ancestor(x,y).
-mother(x,y) | parent(x,y).
-father(x,y) | parent(x,y).
-grandmother(x,y) | grandparent(x,y).
-grandfather(x,y) | grandparent(x,y).
-grandparent(x,y) | ancestor(x,y).
-grandparent(x,y) | -boy(y) | grandson(y,x).
-grandparent(x,y) | -girl(y) | granddaughter(y,x).
-parent(x,y) | -boy(y) | son(y,x).
-parent(x,y) | -girl(y) | daughter(y,x).
-parent(x,y) | -boy(x) | father(x,y).
-parent(x,y) | -girl(x) | mother(x,y).
-father(x,y) | boy(x).
-mother(x,y) | girl(x).
-grandparent(x,y) | -boy(x) | grandfather(x,y).
-grandparent(x,y) | -girl(x) | grandmother(x,y).
-boy(x) | -girl(x).
boy(x) | girl(x).
-parent(x,y) | (mother(x,y) & -father(x,y)) | (-mother(x,y) & father(x,y)).
-parent(x,y) | -parent(y,z) | grandparent(x,z).
-grandparent(x,y) | -parent(y,z) | greatgrandparent(x,z).
-greatgrandparent(x,y) | -boy(x) | greatgrandfather(x,y).
-greatgrandparent(x,y) | -girl(x) | greatgrandmother(x,y).
-greatgrandparent(x,y) | -boy(y) | greatgrandson(y,x).
-greatgrandparent(x,y) | -girl(y) | greatgranddaughter(y,x).
```
502

```
girl(Gaia).
boy(Cronus).
boy(Zeus).
girl(Hera).
boy(Apollo).
mother(Gaia,Cronus).
father(Cronus,Zeus).
father(Cronus,Hera).
father(Zeus,Apollo).
mother(Leto,Apollo).
```
504 end_of_list.

formulas(goals). 506 end_of_list.

% Proof 1 at 0.01 (+ 0.00) seconds.
% Length of proof is 19.
% Level of proof is 4.
% Maximum clause weight is 9.000.
% Given clauses 6.

2 greatgrandson(Apollo,Gaia) # la-bel(non_clause) # label(goal). [goal].
4 -mother(x,y) | parent(x,y). [assumption].
8 mother(Gaia,Cronus). [assumption].
11 -father(x,y) | parent(x,y). [assump-tion].
13 father(Cronus,Zeus). [assumption].
15 father(Zeus,Apollo). [assumption].
24 -parent(x,y) | -parent(y,z) | grandparent(x,z). [assumption].
27 -grandparent(x,y) | -parent(y,z) | great-grandparent(x,z). [assumption].
32 -greatgrandparent(x,y) | -boy(y) | great-grandson(y,x). [assumption].
35 boy(Apollo). [assumption].
64 -greatgrandson(Apollo,Gaia). [deny(2)].
66 -greatgrandparent(x,Apollo) | greatgrandson(Apollo,x). [resolve(35,a,32,b)].
72 -parent(x,y) | greatgrandparent(z,y) | -parent(z,u) | -parent(u,x). [re-solve(27,a,24,c)].
80 -greatgrandparent(Gaia,Apollo). [re-solve(66,b,64,a)].
81 parent(Gaia,Cronus). [resolve(8,a,4,a)].
83 parent(Cronus,Zeus). [re-solve(13,a,11,a)].
85 parent(Zeus,Apollo). [re-solve(15,a,11,a)].
86 -parent(x,Apollo) | -parent(Gaia,y) | -parent(y,x). [resolve(80,a,72,b)].
92 $F. [re-solve(86,c,83,a),unit_del(a,85),unit_del(b,81)].

Fig. 6

AUTOMATED ONTOLOGY SYSTEM

BACKGROUND

It has long been an axiom of computer science that "humans use inductive reasoning but computers use deductive reasoning." Numerous computer science courses begin with a similar axiom and an explanation of the two types of reasoning as a way of coaching students to begin "thinking like a programmer," with the expectation that a good command of deductive reasoning is necessary to perform any programming at all.

To provide background, deductive reasoning is a reasoning process that works from general axioms to more specific, logically certain conclusions. In deductive reasoning, a general rule is developed which holds over the entirety of a closed domain of discourse, and subsequent general rules are applied in order to narrow the range under consideration, allowing a conclusion to be reached reductively once only the conclusion is left as an option. A simple, commonly used example of deductive reasoning is "All men are mortal [a first premise], Socrates is a man [a second premise], therefore Socrates is mortal [the conclusion]." In such an example, the first premise requires all objects classified as "men" to have the attribute "mortal," the second premise requires Socrates to be classified as a member of the set "men," and as such the conclusion can be drawn that Socrates has the attribute "mortal" as a necessary aspect of his membership in the set "men."

Three major reasoning processes may be applied as part of "deductive reasoning," these being modus ponens, modus tollens, and syllogism. Modus ponens is the process described in the example described above, regarding Socrates; a first premise is provided, "If P, then Q," and a second premise is provided, establishing "P." Following the first premise and combining it with the second premise, it may thereby be established that, since P is true, and If P, then Q, then Q is true. Modus tollens is the contrapositive of this. "If P, then Q" is still established as a first initial premise, but as a second premise, it is then established that Q is not the case, the "negation of the consequent," represented as "-Q." Since, as per the first premise, Q must follow from P if P exists, and since, as per the second premise, Q is not present, then the natural consequence of P existing—Q also existing—has not been observed, and therefore P cannot exist. Syllogism is used to bridge premises. For example, "if P, then Q" can be established as a first initial premise, and "if Q, then R" can be established as a second initial premise, meaning that it can be reasoned that "if P, then R." Since P existing would have to mean Q existing, and since Q existing would have to mean R existing, the two premises can be combined in this manner.

There are certain limitations to the process of deductive reasoning, which can limit its application. To start, a distinction must be drawn between the "validity" and the "soundness" of any argument made through deductive reasoning. An argument can be said to be "valid" when, assuming that the premises are true, the conclusion logically follows. "Valid" arguments can still be factually incorrect. For example, it may be said that "if P, then Q," and "P" may be observed to exist, but "if P, then Q" may not be true as a universal rule, and may only be true some proportion of the time. Therefore, in a particular case, "if P, then Q; P; then Q" may be a valid argument, following logically from its premises, but may still be wrong, since it is based on faulty information or information that cannot be properly universalized. "Sound" arguments, on the other hand, are those which are valid and which have true premises. Computers, in particular, have trouble distinguishing between the two, and have little ability to evaluate soundness; for example, a premise that is true 99% of the time can cause significant amounts of difficulty.

Inductive reasoning works in an opposite manner to deductive reasoning, moving from specific observations to broader generalizations and theories. In inductive reasoning, a conclusion may be reached by generalizing or extrapolating from specific cases to general rules which govern all such cases.

Inductive reasoning can be best described by contrasting it with deductive reasoning. In contrast to deductive reasoning, which derives conclusion b from premise a only where b is the formal logical consequence of a, inductive reasoning is fuzzier, and can allow the inferring of b from a, where b does not follow necessarily from a. This means that conclusions drawn from inductive reasoning are based on some degree of guesswork as to what rule actually covers all potential cases, and such conclusions can often be wrong if the observed cases are not representative of the set of all potential cases. For example, if it can be reasoned that, if P is true, then consequently Q, R, and S are each true, deductive reasoning may, if P is established as true, likewise be able to establish Q, R, and S as true. An example of inductive reasoning, however, might have an observer establishing that, upon finding that Q, R, and S are simultaneously true (when Q, R, and S are all relatively independent and such a pattern is rare outside of P being true), P is likely to be true with some degree of probability.

A practical example of inductive reasoning might be as follows. If a number of swans are observed and all observed swans are white, a conclusion may be drawn (and associated with some degree of probability or certainty) that all swans are white. The conclusion is justifiable, but the truth of the conclusion is not guaranteed. (As some swans are black, it is actually wrong in this case.) As such, instead of being able to draw the conclusion of "All of the swans we have seen are white, therefore we know that all swans are white," this conclusion must be associated with an epistemic expectation, i.e. "we expect that all swans are white (based on some level of certainty)."

A further reasoning method, abductive reasoning, is also sometimes necessary. Abductive reasoning is a process principally used in formulating hypotheses, and allows inferring a as an explanation of the cause of b, even without clear evidence establishing that "if a, then b" is a universal principle or premise of the sort that could be applied to deductive reasoning. Logically, abductive reasoning is equivalent to the fallacy of affirming the consequent, or "post hoc ergo proper hoc," because of the possibility of multiple different explanations for b, meaning that a may play a comparatively smaller part than assumed or may even be associated with b as pure coincidence.

For example, given a set of observations O, a theory T, and a potential explanation E, for E to be abductively reasoned as an explanation for 0, then, overall, the system should satisfy two conditions. First, it must be established in some manner that O follows from E and T. Second, it must be established that E is consistent with T. Some "best explanation" can then be selected from multiple Es if multiple Es fit the requirements; often, this requires some sort of subjective evaluation of the simplicity of a given explanation, the prior probability of similar explanations, or the explanatory power of the explanation.

For example, if a white feather is found on the ground, it may be abduced that a swan was present and that the presence of the feather was due to the presence of the swan, because the presence of the swan (losing a feather) would account for the presence of the feather. This would provide a hypothesis explaining the observation. Plenty of alternative explanations may exist, however, which may be seen as less likely; for example, a person may have passed by with a feathered costume or feathered clothing (such as a feathered dress), or a person may have camped there with a down sleeping bag that lost some of its contents (from a rip or tear), or the feather may be from another bird entirely. It may also be conceivable that the feather blew to the location where it was observed from elsewhere. The potential explanations can be evaluated based on their simplicity; for example, if it is known that swans nest in the area and swans can be seen at a distance, the swan explanation may be the simplest, whereas if the feather is found within a ballroom, the swan explanation may require a further explanation of how the swan came to be in the ballroom, why the swan was not removed from the building before reaching the ballroom, and so forth, and a simpler explanation may instead be that the feather fell off of a costume. The potential explanations can also be evaluated based on the prior probability of such explanations being accurate; for example, if a large number of white feathers are observed to be dropped by swans in the area, any newly observed white feather may be likely to have come directly from a swan, even if the feather was not seen falling. However, if a large number of feathers actually come from campers with downy jackets or sleeping bags, and swans avoid the area because of the human presence, then it may be more probable that the feather was left by a camper. Finally, the potential explanations can be evaluated based on the explanatory power of the explanation to encompass other observations as well; for example, if a feather is found having glue on it, an explanation that the feather came from a costume may have more explanatory power (explaining the feather observation and the glue observation) even if swans are likely to nest in the area and people in costume are rarer. Likewise, if a feather is found next to a matted area of grass and a torn scrap of polyester fabric found on a rock, an explanation of the feather having been left by a camper may have much more explanatory power, as it may explain the presence of the matted grass (the camper pitched a tent there or unrolled a sleeping bag there) as well as the presence of the fabric together with the feather (the camper ripped their sleeping bag or jacket on the rock, and a feather came out).

As such, despite many such alternative explanations of a phenomenon, or a collection of phenomena that are observed, a single explanation (or a few explanations) will generally be abduced through this process, as a working hypothesis. Some possibilities can thus be disregarded. (This is suspected to have been an important evolutionary skill for humans, in that it may allow unfamiliar surroundings or unfamiliar situations to be navigated. However, attempts to implement such reasoning with computer systems have been fairly weak, finding a limited level of success in diagnostic expert systems and other such systems.)

As touched on briefly above, deductive reasoning has been much more successfully implemented on computers, and a variety of systems have been implemented for performing deductive analysis tasks on computers. Computers have been used to discover features and patterns in large data sets, to find correlated phrases in text, to analyze image data, and to prove logical theorems by deductive reasoning. This has allowed for large leaps in capability in certain areas, such as image recognition, as data has ballooned in availability. Computers can identify particular patterns in extensive image data sets (such as ImageNet's database of approximately 14 million images, many with manually-added identifiers and descriptors to improve reasoning) and identify features common to many or most of the images related to a certain topic. This allows for computers to greatly assist with the inductive reasoning processes that may be performed by a human operator or programmer. However, the ability to actually invent or understand ideas has remained uniquely human, or at least biological, to the point where even non-human animals are looked at as a more likely source of such origination than computers are. (To date, the United States has had at least one court case regarding the potential intellectual property rights of a non-human animal, but AI-derived IP has been a pure hypothetical.)

A simple example can be considered to demonstrate the existing limitations of computers with respect to automated reasoning. It would be possible, in principle, to present a machine learning program with examples of triangles. A computer program set up to test the relative lengths of the three sides may be able to validate an approximation of the Pythagorean Theorem within some error limit, if presented with enough examples of right triangles, obtuse triangles, and acute triangles. However, the empirical discovery of this approximation could never replace the exact formulation of the Pythagorean Theorem itself, which depends on a foundation of prior geometrical understanding, and which serves as a theoretical underpinning for many diverse areas of mathematics and other sciences that would be difficult to understand without it.

An ongoing trend in the field of artificial intelligence has been its evolution away from the oversimplified apparatus of rule-based systems toward systems not based on centralized control or processing. The large increase in the number of layers in newer convolutional neural network (CNN) systems has made possible the concept of "deep learning," which has dramatically improved the ability to discriminate patterns in imagery, text, and other data by using these highly structured CNNs to identify patterns based on training of the CNN program.

However, detecting a pattern or feature in data is not the same as the understanding the pattern, interpreting the discovery in the context of other information or knowledge, or making theoretical predictions that synthesize broad areas of learning. Even despite advances in pattern detection, because of the limitations of these techniques, there are at present no machine learning systems that can compete with humans at all in areas like comprehending image or text data. The most effective systems, at present, are NLP systems used to try to gauge the sentiment or gist expressed by a text document from the statistical analysis of co-occurrences of words and phrases. Based on this analysis, a sentiment or summary (such as a two-line summary of a news article for a news ticker, or some similar result) may be produced with some accuracy, but only may be discoverable based on statistical data characterizing a large set of such news articles and consistency in the word choice and sentence structure of such articles. No significant amount of anything that could be called understanding of intentions, concepts, or purposes of statements in any media, from text to images to video, has been achieved.

For example, in video analysis, detection of movement is relatively simple, and identification of objects based on features often succeeds, but it is difficult for a computer to construct a narrative based on object recognition and a priori knowledge of objects in a scene. Even if the identity of each object and the positions of each object are "known" throughout the duration of the video, the computer has little to no ability to identify what is actually happening in the video without the same sorts of techniques used in image recognition in the first place. (For example, a machine learning-based reasoning system may be able to analyze a video clip of a person throwing a ball on the basis of still images in the video clip, and may be able to identify individual frames on the basis of their similarity to other images. For example, it may be able to identify that the video clip includes "man holding ball," "man AND ball," "man" (with the ball then being out of the frame), but may not be able to chain all of the aspects of the video clip into any sort of narrative. Similarly, natural language processing (NLP) can extract patterns in word groups in vast amounts of text data, but that is different from reading and comprehending the text. ML systems would readily fail the Turing Test, which requires computers to match human intelligence to a degree that makes them indistinguishable from humans.

Automated theorem-proving programs have been applied to automated reasoning problems with mixed success. By way of background, automated theorem-proving programs or algorithms, "ATPs" for short, are or use algorithms for proving mathematical theorems using computer programs. In such programs, knowledge is codified as "theorems," assumptions and postulates are codified as "axioms," and hypotheses are tested for truth or falseness by a process known as "paramodulation," which consists of testing the consistency of the hypothesis with the prior knowledge contained in the stored axioms. Examples of success include hardware verification, proof verification, demonstration of the correct ness of computer programs, and model checking. Automated theorem proving algorithms have been applied in physics, geometry, and computer vision, among other areas. Automated theorem proving algorithms have been used as proof assistants in checking the correctness of mathematical proofs, and in some cases, have discovered proofs for unsolved conjectures.

However, in general, automated theorem proving programs need operator assistance and human control to operate successfully, due to factors such as a lack of flexibility. (For example, almost all ATP programs require a highly formatted input structure that is not only not necessarily compatible with most types of inputs but is not necessarily compatible with many types of data, as many types of data cannot be tested for consistency with the prior knowledge contained in the stored axioms by existing ATP software.) A basic strategy for using such systems is to apply inference rules to demonstrate that a conjecture is a logical conclusion of given propositions. The process may formalize logical systems in such a manner as to apply constructs from propositional calculus, and may use first-order logic structured as sentences containing assertions with variables. One example might be the expression "Jupiter is a planet," which might be expressed using the logical statement "planet(x). x=Jupiter."

Another such approach to proof checking systems or other similar systems is called paramodulation. Paramodulation is a method of theorem proving in which rules of inference operate on two clauses to yield a third clause. In the simplest cases, it can be a trivial statement of the transitive property, where appropriate variables are substituted for other variables; for example, if a=b and b=c, then a=c. However, the process can be used to map complex hierarchical relationships and is not confined to obvious equalities. Properties of set theory and Boolean logic can be expressed with this formalism.

No systems have yet been created that go beyond proof checking and statistical processing of language and imagery. Most importantly, no systems have been able to, by themselves, generate interesting conjectures, in a manner that could match or exceed human capabilities. Some algorithms exist that can solve problem sets created for theorem provers. Algorithms have been designed to propose interesting conjectures for solutions to riddles and puzzles, where "interesting" is defined by values such as the degree to which a particular hypothesis is "surprising," the degree to which it is "novel," or the degree to which it shows "complexity." (It may be noted that this is somewhat contrary to typical principles of abductive reasoning and hypothesis drafting, which, as discussed above, emphasize simplicity and consistency. A major reason for this is that, because such systems are in their infancy, they cannot easily supplant processes that humans are good at, but can potentially supplement such systems by providing unusual reasoning that humans may not necessarily have duplicated, but which may sometimes have value.) The basic idea is to generate hypotheses from existing rules in an "ontology," defined as a set of concepts and categories in a subject area or domain that shows their properties and the relations between them. This can be accomplished as a permutation of existing relationships, or a search through a tree like structure.

Some automation has been achieved along these lines in generating hypotheses for autonomous experimentation. For example, by using comprehensive feedback loops, it has been possible to improve the rate for serial carbon nanotube experiments by a hundred-fold. The methodology makes it possible to develop new or more accurate hypotheses, explore a large parameter space of possible experiments, generate multivariate questions, and optimize the parameters that may be applied to lab experiments. The autonomous method plans, generates, and evaluates its own experiments. However, the application of even similar types of techniques to different problems has thus far been limited, because of the need to tie the method to a rule-based format that can be optimized using these comprehensive feedback loops.

SUMMARY

A method of automated generation of conjectures may be contemplated herein, together with various exemplary embodiments suited for one or more specific applications of such a method. For example, according to some exemplary embodiments, such a method may be employed for experimental purposes, and may for example be used to automatically generate hypotheses, in such a manner as to allow those hypotheses to be automatically tested and validated, if desired. In other exemplary embodiments, such a method may be used to allow a system to respond to new scenarios and to make conjectures in non-laboratory contexts. For example, according to an exemplary embodiment, it may be contemplated to have a system that reads text, listens to spoken language, or views images or video, and then formulates a response or a reply to a user based on comprehension of the input, or generates some form of classification for the text, spoken language, or video.

In a first exemplary embodiment of a method of generating conjectures, it may be contemplated that some existing systems allow for some limited generation of conjectures, such as interesting conjectures, provided that such conjectures are represented in a rule-based format. As such, according to an exemplary embodiment, it may be contemplated to use a method such as described herein to generate rule-based formats from natural language text.

According to an exemplary embodiment, a NLP program, such as the Stanford NLP program, may be provided and may be configured so as to parse a sentence into a desired structure. Such NLP programs, like the Stanford NLP and analogues, may function in a form such that, or may be configurable to a form such that, they may be used to construct sentence diagrams from input text provided in English or other languages. For example, in an exemplary embodiment, a sentence may be parsed into a tree-based structure in a manner that defines the relationships between each entity in the sentence.

The output of the NLP program may then be used in order to generate functional relationships between the entities identified in the sentence, which may then be used in order to generate the desired rule-based structure. This may then be processed by automated theorem-proving software, in such a manner as to allow the automated theorem-proving software to conduct operations. In various exemplary embodiments, the present method of automated generation of conjectures may solve the problems of accomplishing the translation of the text into coherent rules and then searching the rule space for possible relationships or conjectures that can be used in order to operate the automated theorem-proving software.

According to an exemplary embodiment of a method, several stages may be understood. In a first step, the method may begin with formation of a knowledge domain through ontological engineering. In a second step, the method may perform ingestion of information from open sources. In a third step, the method may perform transformation of the ingested information into theorems or other rule-based structures. In a fourth step, the method may perform conjecture generation, and in a fifth step may perform hypothesis testing. Each such step may be discussed in turn.

According to an exemplary embodiment, the method may make use of the PROVER9 first-order logic theorem prover. This system makes use of predicate calculus, implemented in the PROLOG computer language. Other accompanying systems, such as the MACE4 program used for finding exceptions in theorems, may also be used or may be used instead, such as may be desired. In certain exemplary embodiments, systems such as the systems selected above may be chosen for their simplicity and ease of use, or their ability to easily handle inputs provided in the form of text files; in other exemplary embodiments, other theorem proving programs may be chosen and may be used in addition to the above or instead of the above, such as may be desired, based on any criteria that may be desired such as the ability to input or output data in a particular format, processing efficiency, or any other such criteria.

In an exemplary embodiment of a system, a theorem prover may be used in order to perform the following steps. In a first step, from a list of incomplete rules stored in an acceptable format for the automated theorem prover (ATP) (which may need to be preceded by a "step 0" in which data is appropriately formatted), various permutations of existing rules may be formed by the software. Each permutation of a rule may represent a conjecture. The permutations may be generated from existing theorems (rules) in the database. This may make it possible to constrain the conjectures to a search space that spans a practical limit of reasonable assertions, by ensuring that the tested results have at least some similarity to an existing, previously-tested result.

Once these permutations have been formulated, and placed in the correct format, each permutation may be tested in the theorem-proving software. For example, according to an exemplary embodiment in which the PROVER9 software is used, the format for such software may be to write the hypothesis to be tested as a line by itself below the postulates. A formatting tool may be used, if desired, to generate text files corresponding to the theorems to be tested.

The program may then function to filter out the false conjectures, and retain the conjectures leading to valid proofs. The valid proofs may then be sorted according to particular criteria in order to identify which of the proofs are most likely to be of interest. (One such method of sorting the proofs according to an anticipated level of potential interest is, for example, the tree complexity calculation offered by the PROVER9 software.)

An example employment of such software may be provided below, in the Detailed Description, in order to demonstrate how the software may be employed as a component of the presently described method. Specifically, such software may be used in order to generate a family tree for the characters of Greek mythology, based on the interrelationships that each character has with one another.

The generation of conjectures can be applied iteratively; once theorems are proven, they can be added to the ontology. In this way, the machine learning system is able to develop, validate, and test a world view that comprises a universe of relationships.

Likewise, the generation of conjectures can handle other sorts of input data, including input data that has fuzzy logic and uncertainty inherently incorporated into it. In such an example, hypotheses that contain concepts such as "some," "all," or "none" may be generated; in other exemplary embodiments, a system may attempt to estimate probabilities or retrieve probability data, if such is desired.

In some exemplary embodiments, such a methodology may be applied to text-based information such as is described herein, but in other exemplary embodiments, such methodology may be applied to encoding any other sort of set-theoretical relationship, such as computer vision, network topology, geometrical theorem proving, or any other such application such as may be desired.

Now that an exemplary embodiment of software that may be used to perform aspects of the present method has been described, each of the five steps discussed above may be further described.

As noted, in a first step, the method may begin with formation of a knowledge domain through ontological engineering. To provide some examples of how this might work, it may be contemplated that the English dictionary may function as a potentially complete ontology for many practical purposes. (In certain exemplary embodiments, various permutations of an English dictionary, or subsets thereof, may be envisioned as making up this ontology, and as such the use of terminology like "a dictionary" may not necessarily be limited to a single dictionary or database source. For example, one example ontology could be derived from a digitized version of a standard English dictionary, such as the MERRIAM-WEBSTER dictionary or OXFORD ENGLISH DICTIONARY. In another exemplary embodiment, a lexical database of English such as WORDNET or CONCEPTNET may serve as a source of an ontology, instead of or in addition to the use of the standard dictionary. In certain exemplary embodiments, multiple dictionaries or databases may be combined. Various forms of combining sources as part of a process of generating a combined dictionary or overall ontology can also be contemplated; for example, a "dictionary" can be a combination of dictionaries and databases in a manner that optionally incorporates reliability scoring or ranking to distinguish certain dictionaries or databases from one another or direct the ontology toward the results provided by more reliable sources. For example, it might be desired to make use of a combined dictionary in which the OXFORD ENGLISH DICTIONARY is used as a baseline, potentially less reliable sources like DICTIONARY.COM or WIKTIONARY are used to fill in gaps in circumstances where the OXFORD ENGLISH DICTIONARY does not provide a definition, and even less reliable sources like URBANDICTIONARY are used to fill in additional gaps in circumstances where none of the preceding sources provide a definition.)

All English words may, in this case, be defined by other English words (including, for example, words of foreign origin that have been absorbed into English, like entrepreneur, resume, and the like), or may have their meanings inferable based on similar words (for words with similar roots and so forth). As such, a standard dictionary may be transformable into a complete first-order logic (FOL) ontology, using automated methods such as outlined above, or by meticulous human translators. The English language, and spoken languages in general, are challenging because they are rich in nuance; certain words, and especially certain phrases, may have different meanings based on the context in which they are used. However, it may be possible to generate rich ontologies for FOL from a limited vocabulary.

As an example, certain dictionary definitions may be translated into FOL assumptions to show how this process might be performed by an exemplary embodiment of the system. For example, as defined in a standard dictionary—in this case, Webster's Collegiate Dictionary, 1948—a "mother" may be defined as "a female parent, esp. one of the human race; specif. [often cap.], one's own mother." Parsing this information on a system such as is presently defined, "mother" can be defined as a "female parent," and if desired additional nuance may be added, either based on probability (a "mother" may have a high probability of being a female parent, and a slightly lower probability of being a human female parent, with a low probability of referring to a human female parent of the speaker, which may be adjusted to a higher probability if the word is capitalized) or based on "suggestion" associations that may be evaluated at a later stage of the processing, if desired. As such, although it is noted that there are several alternative definitions (and methods of processing alternative definitions are given below), for the immediate purpose of example, the definition given above will suffice.

As noted, the definition above may imply, at the most basic level, a "female parent." This may be represented as the first-order logic statement "-parent(x)|-female(x)|mother(x)." That is, stated in English, an object can be not a parent ("-parent(x)"), not a female ("-female(x)"), or can be both. If the object is a parent and a female, then it will be defined as a "mother" ("mother(x)"). Going through each character in detail, if something ("x") is not ("-") a parent ("parent(x)"), then the statement is true. Alternatively/"or" ("|"), if that something ("x") is not ("-") a female ("female(x)"), then the statement is also true. As one last alternative ("|"), if neither of the preceding statements are true (NOT "-parent(x)" AND NOT "-female(x)") then the last statement must be true, and the object ("x") must be a mother ("mother(x)").

The definition of "female" in that same dictionary is "a woman or girl; a female human being; also, a female animal." Therefore, representing this definition in terms of first-order logic, the first-order logic statements "-girl(x)|female(x)" (that is, if something is a girl, then it is female; therefore, it must either not be a girl ("-girl(x)") or must be a girl and therefore must be female ("female(x)")), "-woman(x)|female(x)" (that is, if something is a woman, then it is female; therefore, it must either not be a woman ("-woman(x)") or must be a woman and therefore must be female ("female(x)")), "-female(x)|animal(x)" (that is, by the rest of the definition, if something is female, it is an animal, such that it has to be at least one of not female ("-female(x)") or an animal ("animal(x)")), and "-female(x)|human(x)" (that is, if something is female, then it is a human, such that, according to this definition, it has to be at least one of not female ("-female(x)") or a human ("human(x)")) would be used. In some exemplary embodiments, some of these definitions may be expected to be nested; for example, a "human" may inherently be an "animal," and "-female(x)|human(x)," if adopted as the definition, may inherently imply "-female(x)|animal(x)." In other exemplary embodiments, each statement may be separate from one another and assigned a separate probability; for example, "-female(x)|animal(x)" may be highly probable (with a potential exception being, for example, a "female" end of an electrical plug) and "-female(x)|human(x)" may be somewhat less probable (and again necessarily imply "-female(x)|animal(x)").

The definition of "girl" is "female child." Therefore, this may result in the first-order logic statement "-female(x)|-child(x)|girl(x)," based on the reasoning provided above; if something is female, and it is a child, then it is a girl. (In some exemplary embodiments, it may instead be preferred to have a statement such as "-female(x)|-human(x)|-child(x)|girl(x)," depending on how terms like "female" are defined, or what their probabilities are. In some exemplary embodiments, such definitions may be gleaned from combining the results of different dictionaries in order to generate the most consistent possible definitions, or in order to assign probabilities based on how often particular concepts are phrased in each dictionary. For example, if all dictionaries define a "girl" as at least a "female child," but some specify that a "girl" is a "human female child," the first-order logic statement "-female(x)|-child(x)|girl(x)" may be generated, with a lesser probability associated with "-human(x)."

Each of these objects has been written as a function that has one variable. However, the definition of "parent" is "one who begets or brings forth offspring; a father or a mother." Hence, the following FOL definition can be constructed: "-father (x, offspring)|parent(x, offspring)," and "-mother (x, offspring)|parent(x, offspring)," whereby if something is a father (with offspring) then it is a parent (of that same offspring), and likewise if something is a mother. The same exercise can be carried out for the other English words used in the previous section, such that any additional variables are added as applicable. (For example, a "child" may necessarily have a "parent.")

As touched on to some extent above, certain words may have alternative definitions, which may parallel one another (for example, a "female" referring to an animal or to a human, which is necessarily an animal) or which may be exclusive with one another (for example, a "female" referring to one part of an electrical plug and having nothing to do with animals or humans whatsoever). It may even be understood to have the same words function as nouns, verbs, or other parts of speech. One other example of an alternative definition, for "father," is "a priest." As such, according to an exemplary embodiment, two different definitions may be constructed, for example, "-parent (x, offspring)|-male(x)|father(x, offspring)," and "-priest(x)|father(x)." In some exemplary embodiments, words may be assigned particular probabilities based on the frequency of use or the context of use; for example, just as was the case with "mother" versus "Mother," the capitalization of the word may affect which usage is more likely. (For example, "Father" used as a proper noun may be most likely to refer to the speaker's parent, while "Father X" may be most likely to refer to a priest.)

According to an exemplary embodiment, in order to process such words with ambiguous references, two or more parallel ontologies may be tested for provability. This could be accomplished using the same search space generation techniques for conjecture generation that were described in the previous section. (For example, in an exemplary embodiment, probabilistic reasoning may then be applied to resolve which of the ontologies is more likely to be accurate, with the highest match being taken as the accepted ontology.)

Such a system may be consistent with, and may be able to draw from or even export to, certain systems of classification hierarchy that may be used in Web documents. For example, according to an exemplary embodiment, the system may be adapted to import information from, or export information to, the Ontology Web Language (OWL) or the Resource Description Framework (RDF), each of which may function as such a system of classification hierarchy. For reference, the OWL and RDF systems, and other such systems, are Internet taxonomy systems that allow development of ontologies or related taxonomy classification schemes that relate objects to other objects. Other such systems of classification hierarchy may also exist and may be made use of in other exemplary embodiments, such as may be desired.

To describe some of the above example systems in more detail, it may be noted that, in the OWL languages and variants thereof, semantic relationships may be encoded into the languages. RDF, on the other hand, may use "triples" that include a subject, predicate, and object strung together ("subject-predicate-object") which may be easily expressed in FOL format. For automated translation into FOL, according to an exemplary embodiment, the ontologies may be derived from the implicit logic built into the sentence trees, and may then be worked into the existing ontology stored as a database of theorems.

Moving forward, as noted, in a second step of an exemplary embodiment of the present method, the method may perform ingestion of information from open sources. According to an exemplary embodiment, this may allow for generation of axioms for a theorem prover through the use of web searches (either of particular areas of content or unrestricted web searches, such as may be desired) or ingestion of documents or other materials, which may be written in plain text such as may be desired.

According to an exemplary embodiment, the present system may be provided with a parser which may be configured to translate natural language into FOL statements. According to an exemplary embodiment, in order to implement such functionality, an approach to text processing may be taken which differs from standard Natural Language Processing statistical approaches. For example, in order to apply first-order logic, it may be contemplated to treat words in text like subroutines or functions that may be input into a NLP-based compiler that generates first-order logic statements for the ontology.

Many current NLP algorithms are configured to be, or to use, statistical searches that measure the frequency of use of selected words and their co-occurrence with other words. This allows certain words to be related to certain other words, allowing certain functionality such as auto-typing suggestions to be implemented. However, though these features are interesting, they do not actually provide any meaning of the text; a first word may be followed most commonly by a second word, which may be suggested to a user as an automated suggestion or used for whatever other purpose may be appropriate, and then the second word may be followed most commonly by a third word, which may be handled in the same way (generally based on the second word, and, to a lesser extent, the first word and the use of each word together). This application of ML is inherently approximate and statistical; it is incapable of understanding text as humans understand it; it does not help build a complete ontology, and can attribute no actual meaning to concepts other than co-occurrence and frequency. For example, such a system may be easily able to predict that, when someone types "Happy" followed by "Birthday," they are likely to follow that up with "To You." However, the system cannot divine any meaning from this on its own, and manual suggestions must typically be added if any particular functionality is desired to be paired with such a system. (For example, if it is desired to pair such a statement with certain options to provide an image, emoji, or other greeting, such greetings must generally be tagged with appropriate use terminology.)

NLP-based grammar parsing technology is more mature, and has been used for translation of natural language using grammatical rules for over a decade. NLP has also been combined with theorem-proving software in the question answering system LOGANSWER; natural language queries are transformed into formatted query terms and processed by FOL against an extensive knowledge base. Some forays into automated ontology generation and domain knowledge acquisition have been made using natural language text; for example, robots intended to generate a movement area ontology have been able to incorporate some level of natural language processing in order to more properly define an area in which the robot may move or operate. Likewise, some attempts have been made at generating programs through natural language.

However, as yet unsolved is the concept of processing the NLP tree structure of sentences by a natural language parser that generates FOL statements, analogous to the parsing of programming statements by a compiler, particularly based on knowledge gleaned from directed searching rather than through detailed dictionaries fed into the NLP system. Unlike standard programming languages, which have a limited number of context-sensitive features, natural languages have many context-sensitive features; as such, it is significantly more difficult to provide a system that can automatically generate coherent sentences than it is to provide a system that can automatically generate simple program statements. Multiple tree structures and graph representations may be constructed for many sentences in natural languages such as English, and meaning can be ambiguous even to human listeners.

According to some exemplary embodiments, however, it may be contemplated to resolve ambiguities in word meaning or sentence structure by optimizing a finite search space, in which multiple interpretations of sentences into FOL are evaluated for the highest consistency with prior assumptions. For example, based on the example used previously regarding a "Father" being a parental figure versus a priest, it may be contemplated to determine, with the system, whether previous words and phrases used in the text related more closely to religious institutions, implying that this was the topic of conversation and that an ambiguous use of "Father" referred to a priest, or whether previous words and phrases used in the text related more closely to family institutions, which might imply in some cases that an ambiguous use of "Father" referred to a parental figure. Alternatively, the system may look for other directly related terms or similarly-structured sentences, or may otherwise evaluate sentences for the highest consistency with prior assumptions. Such a system may be contemplated to use multiple approaches, if desired; for example, multiple approaches may be sampled in order to reduce the effect of any one approach being fooled, or a different approach may be tried in turn if the system cannot resolve the ambiguity with a first approach. (For example, in one exemplary embodiment, when evaluating a sentence for the highest consistency with prior assumptions, a "topics approach" may be attempted. However, if the usage of the word is still irreconcilably ambiguous—for example, one could contemplate having a bride or groom give a wedding toast such as "Father, I want to thank you for being with us today . . . " that could be entirely consistent with either interpretation—the system may determine which usage has the highest consistency with prior assumptions based on another method. For example, it may be determined that the groom had just toasted his mother with the same language, and as a result is probably talking about a parental figure.)

It is noted that, though an unconstrained search space may be NP-complete, the search space applied to this problem has inherent constraints that may make possible a global optimization within a finite error bound.

The concept of employing natural language processing for such purposes may be demonstrated by the following example, which, as discussed previously, may make use of the family tree of characters in Greek mythology. For the sentence, "Zeus is the father of Apollo," the following output may be generated from a NLP system configured according to an exemplary embodiment of the present method: "<parse>(ROOT (S (NP (NNP Zeus)) (VP (VBZ is) (NP (NP (DT the) (NN father)) (PP (IN of) (NP (NNP Apollo))))) ( . . . )))</parse>."

In the above string, the encoded data structure may represent a tree. Each left parenthesis implies a new child node, and each right parenthesis implies a traversal back up the tree. This may be based on the following identifiers: ROOT (the root of the subtree), S (the start of a particular sentence), NP (defining the next phrase as a noun phrase), NNP (defining the next phrase as a proper noun phrase), "Zeus" (the subject of the sentence), VP (defining the next phrase as a verb phrase), VBZ (defining the next phrase as a third-person singular present verb phrase), "is" (the verb phrase in question), NP(NP) (identifying that "the father" and "the father of Apollo" are nested noun phrases, DT (defining the next phrase as a determiner), "the" (the determiner in question), NN (defining the next phrase as a singular or mass noun), "father" (the singular noun), PP (defining the next phrase as a prepositional phrase), IN (defining the next phrase as a preposition or subordinating conjunction), "of" (the preposition in question), and "Apollo" (another proper noun). These linguistic identifiers may allow a computer to process the natural language text at a level that allows for meaningful interaction between the computer and the language text, by conclusively identifying the syntactic categories of each element in the sentence.

In the PROVER9 software or similar such software, such a string as provided above may be represented as a theorem, "father (Zeus, Apollo)," with the "father(x, offspring)" function discussed earlier using the parameters x="Zeus" and offspring="Apollo." Likewise, the function "parent(x, offspring)" may share the same parameters and may likewise be satisfied.

Based on the above logic, it may be apparent that dictionary definitions, provided in English (or in any other language such as may be desired, or even in a combination of languages if such is desired) as complete sentences or otherwise in the form of natural text may be expressed in a first-order logic format suitable for the building of an ontology for such data. In some exemplary embodiments, then, this information may then be used for the purpose of automated conjecture generation based on some applicable technique, such as one of the techniques provided herein. Any other complete sentences or other textual information, such as "a girl is a female child," may be similarly digested and processed into forms such as the above. That is, such sentences may be parsed into tree form ("<parse>(ROOT (S . . . ") and may then be translated into FOL format.

In other exemplary embodiments, other processing programs other than PROVER9 may be used. For example, according to an exemplary embodiment, the PROVER9 structure shown above may be analogous to the triple table structure used in RYA, a Resource Description Framework used for developing metadata for the Internet. As such, RYA, or any other such framework or program, can be used alongside or instead of PROVER9. Such a decision may be based on any criteria, such as may be desired. For example, in certain exemplary embodiments in which greater flexibility is important, PROVER9 may be chosen over RYA or other programs that are less flexible; in other configurations in which the inputs and outputs of the system are more easily determined or controlled, or in which flexibility is otherwise less important, this may not be as significant a concern and another program or framework may be chosen. In PROVER9, for example, theorems of form F(x1, x2, x3, . . . xn) can be formed, such that even a very large number of words and phrases may be handled by the system when expressed in the form of a theorem. Since the pattern matching algorithm may not be restricted to triplets, allowing even sentences with highly complex syntactic structure to be translated into the required form.

The translation of English into FOL (or of another language into FOL, if desired) may involve syntactical rules similar to parsers and compilers. For example, some words in English may be treated as reserved words, such as "if," "then," "else," "and," "not," "or," etc., which may in some exemplary embodiments be parsed in a way that resembles structured program compilation. In order to implement this using NLP, according to some exemplary embodiments, the following processing steps may be taken. First, NLP software may be used to identify the parts of speech associated with all words, thereby making it possible to extract reserved words such as the above ("if," "then," and so forth). Second, the NLP software may be used to generate a tree structure of hierarchical clauses, making it possible to generate dependencies recursively.

For example, words such as "all," "some," and "none" may be identified, in a natural language processing context, as "DET" or "DT," which as discussed above may indicate that these terms are "determiners" or "articles." This may allow a FOL parsing tool to generate FOL statements to relate statements in English to operations on set theoretical constructs such as union, intersection, equivalence, and uniqueness. For reference, the union of a collection of two or more sets may be the set of all elements of the collection, while the intersection of two or more sets may be the set of all elements common to each set. Equivalence may refer to certain terms being interchangeable for one another or otherwise equivalent, and uniqueness may refer to the likelihood that a term has a particular unique definition, allowing for ambiguities to be reduced by the mapping of an appropriate ontology to the words and phrases as a whole based on more unique terms. (For example, "father" or "cardinal" may be less unique than "priest" or "pope.")

The strategy for generating FOL statements for simple declarative sentences using a tree structure may, in certain exemplary embodiments, be as follows. First, parsing of the tree structure may begin at the root (ROOT). Each left parenthesis may be used to generate a new child tree node which may be inserted at one level higher than the present level in the tree structure.

As touched on previously, many NLP systems may use certain character codes (usually two or three-character codes) as reserved words, which instruct the system as to the syntactic category of the following word. For example, "NP" may indicate a noun phrase, "VP" may indicate a verb phrase, "S" may indicate a sentence, "DET" may indicate a determiner/article, "N" may indicate a noun, "TV" may indicate a transitive verb (which takes an object), "IV" may indicate an intransitive verb, "PREP" may indicate a preposition, "PP" may indicate a prepositional phrase, and ADJ may indicate an adjective. Other such codes may also be contemplated. In some exemplary embodiments, it may be contemplated to have text be preprocessed and formatted according to specific logic, to eliminate the potential for any of the parsed text to have any of the reserved words. (It may, for example, be contemplated that a computer science text may discuss the concept of NP-completeness, that a political or business text may discuss a VP, or that a medical text may reference an IV—or that any text may reference a TV.) For example, in one exemplary embodiment, all parsed text may be converted into lower-case form (for example, "zeus" and "apollo") or may be assigned some other indicator in order to indicate that the term was originally capitalized (for example, "z_eus" and "a_pollo") while allowing it to be presented to the NLP program in lower case to avoid potential confusion with reserved words, if desired. (In some exemplary embodiments, it may be sufficient to have each parsed word be provided between or in association with other symbols, such as between quotation marks, to indicate that it is part of the parsed text string, while leaving each reserved word outside of the symbols, if desired.)

Once appropriately formatted, an exemplary embodiment of a NLP system may determine if a word appears after a part of speech reserved word, before the right parenthesis. If it does, the word may be parsed and identified as a noun or verb, as a prepositional term (such as, for example, "if" or "of") or a qualifying term (such as, for example, "all," "the," or "some"). (Other words, such as adjectives, adverbs, and the like may also be identified through a similar process.)

In some exemplary embodiments, certain words or phrases appearing in the sentences themselves may also be identified as reserved words or reserved phrases, such as may be desired. For example, according to an exemplary embodiment, the word "is" may be identified as a reserved word. In certain exemplary embodiments, reserved words may include similar words to "is" that may help in separating subject and predicate, making it easier to construct simple theorems. (Other variants may include, for example, other conjugations of "to be" like "are," or even phrases like "is not.")

In certain exemplary embodiments, a separate classification may be created for proper nouns, such that nouns may be divided into proper nouns and improper nouns. (In some exemplary embodiments, capitalization of words or use of reserved words like "IV" in the text of a sentence may be similarly handled, with a new category, such as may be desired.) In an exemplary embodiment, proper nouns may be treated as specific instantiations of a general category. For example, "Zeus" is a proper noun, and "deity" is a general category of which "Zeus" is a specific instance. In some exemplary embodiments, a tree structure or a FOL structure may include references to the general categories which the proper nouns are specific instantiations of; for example, "Zeus" may be represented as "deity(Zeus)," ("Zeus", deity) or some variant thereof, if desired.

Once the content has been inserted, according to an exemplary embodiment, the expression may be closed with right parentheses. This may also serve to return the pointer to the parent node at one level lower than the present level.

After definitions have been assigned using a procedure such as the exemplary procedure defined above, subsequent text processing may be used to either provide additional definitions or instantiations of the defined objects. For example, according to an exemplary embodiment, the sentence "Jane is a girl" may, once run through a NLP system, produce the simple theorem "girl(Jane)." The object "Jane" may thus inherit all of the properties associated with conjectures generated for the definition "girl," in addition to other theorems and conjectures assigned specifically to "Jane." This may likewise work recursively, with "girl" inheriting the properties of "human," "human" inheriting the properties of "mammal," "mammal" inheriting the properties of "animal," and so forth. Terms may also inherit properties associated with conjectures generated for multiple different terms; for example, "girl" may imply "human" and "female" and "juvenile," and may inherit all of the properties of each. Each of these may be invoked similarly, as, for example, "human(girl)," "female(girl)," "juvenile (girl)," and so on and so forth with any other terms such as may also be used. This may likewise be the case with any other terms, such as, for example, "deity(Zeus)." Mutual inheritance may also be contemplated, in the case of certain words being synonyms; for example, if "deity" and "god" are treated as synonyms, then both "deity(god)" and "god (deity)" may be invoked. (Still other variants, including aspects like partial inheritance, may also be contemplated, if desired. For example, a definition provided for "god" may be associated with some probability that the character in question is male, whereas "deity" may be gender-neutral; as such, it may be contemplated to have "deity" inherit from "god" all of the properties associated with conjectures generated for the definition "god" apart from those associated with "male.")

For example, for the sentence, "Zeus is the father of Apollo," the translation of the NLP output, "<parse>(ROOT (S (NP (NNP Zeus)) (VP (VBZ is) (NP (NP (DT the) (NN father)) (PP (IN of) (NP (NNP Apollo))))) ( . . . )))</parse>" may be parsed in a manner analogous to the behavior of a compiler. For example, according to an exemplary embodiment of a parser, parsing of the above NLP output may include the following steps. In a first step, the NLP output tree may be traversed from the leaves through the nodes (upwards) and backwards (right to left). For example, parsing may start with the word "Apollo" in this case.

In the above tree, "Apollo" may be identified as an instantiation with stored properties NP and NNP, identifying it as a noun phrase and a proper noun phrase, respectively. Next, "of" may be determined to have property IN. Next, the PP property for "of Apollo" may send a message that the next concept preceding "of Apollo" should reserve a placeholder for "Apollo" in the second position of the expression being formed; that is, the token "Apollo" is the object or predicate in this arbitrary protocol. The theorem, then, may initially contain the terms "x(x, "Apollo")."

The expression "the father" may then likewise be parsed in a similar way. In this case, however, "father" may not be a proper noun; instead, "father" is identified as NN rather than NP, and therefore may be tokenized as a function rather than a variable in the theorem. As such, thus far, "the father of Apollo" may be translated as "father(x,Apollo)."

Next, "is" may be parsed. Parsing "is . . . " may indicate that the subject in the expression about to be parsed is to be assigned in the position of x in the Father theorem. Once "Zeus" is parsed, it may be assigned there. That is, the parser may parse "Zeus," assign properties of NP and NNS, and replace x in the expression with Zeus. The final expression may thus be "Father(Zeus,Apollo)." This sentence may be ingested into the list of theorems.

It may be noted that, in an exemplary embodiment, general terms such as "whoever" or "the person" may be translated into variables such as "x" and "y." Lowercase for arguments and parameters may be used in PROVER9 to indicate that the terms are variables rather than instantiations; other conventions may be employed when using other software frameworks or other programs, such as may be desired.

Upon the completion of the first through fourth steps, an exemplary embodiment of the system may perform hypothesis testing based on the generated FOL axioms. For example, in an exemplary embodiment wherein the system is parsing particular text, the hypotheses generated by the system may be checked by human intervention in order to determine if the ontologies generated are reasonable. (In some exemplary embodiments, a system may perform some level of self-checking, based on the probabilities associated with applying any one particular ontology, and may highlight the areas it has determined to have the lowest probabilities of matching the ontology in order to direct the human oversight appropriately. For example, according to an exemplary embodiment, when there is a high level of ambiguity about whether "Father" is referring to a parent or a priest, a system may choose one or the other based on a calculated probability, and may highlight the largest contributing factors to its lessened level of certainty.)

Hypothesis testing may also be performed automatically, if desired. For example, it may be contemplated to have the system retrieve lower-reliability data (for example, from automated internet searches) which is available in higher quantities, and retrieve higher-reliability data (for example, from dictionaries or from trusted sites) which is available in lower quantities. The ontology that is created as the result of Internet searching may be checked against the ontology created based on the dictionary in order to assess the overall accuracy of the ontology created via internet searching.

This may allow for easier implementation of NLP parsing and conjecture generation capabilities. As touched on previously, such capabilities may be progressively more difficult to develop based on a large size or low search feasibility of the ontological basis, with the most challenging problems being identified as "AI-complete." (This terminology is used to imply that the difficulty of solving said computational problems conclusively is equivalent to that of solving the central artificial intelligence problem, and requires making computers as intelligent as people, or so-called "strong AI.") For example, the Second Edition of the 20-volume Oxford English Dictionary contains full entries for 171,476 words in current use, and 47,156 obsolete words. To this may be added around 9,500 derivative words included as subentries. (These words include words that have multiple highly distinct meanings which may be defined separately; for example, "dogs" may be a plural noun, referring to multiple canines, and also may be a present tense of a verb that means "follow someone or their movements closely and persistently.") Numerous other phrases have a meaning that is distinguishable from, or even entirely distinct from, their component words; for example, the phrase "dog-tired" may use the word "dog" to provide emphasis, not to imply the presence of any canines. Numerous words with identical meanings may also have multiple variants (for example, "hotdog," "hot-dog," and "hot dog" are all used). While the connectivity of many of these words with one another is linear, many axioms may be required in order to encode the relationships between the words in an ontology, which may in common usage be provided by shared experience and must be formulated in such a manner as to replicate the shared experiences that make it possible to encode meaning efficiently for human listeners. Alternatively, the system may be able to formulate such axioms on its own through internet searching or other textual searching, such as searching of books, newspapers, official records such as the Congressional record, and so forth, which may include all sorts of text including text formatted conversationally.

Such processes may ensure that, in some exemplary embodiments, domain knowledge does not have to be encoded entirely by hand or even at all by hand. In an exemplary embodiment, automated internet searches may be used to harvest vast quantities of domain knowledge, the searched information may be subject to any preliminary screening that may be appropriate, and procedures such as are described herein may be used in order to translate the domain knowledge into FOL axioms. Such procedures may be applied to various types of NLP architecture, such as a convolutional neural network (CNN) NLP architecture, such as may be desired. Such procedures may also be applied to other systems including systems not involving text data; for example, it may be contemplated to apply such systems in connection with a CNN equipped to analyze image data in order to encode knowledge obtained via the CNN into axioms related to image analysis.

As previously discussed, it may also be contemplated to automatically encode levels of uncertainty into the system, associated with some or all words or phrases or even whole sections of the ontology. For example, while it may be easier to have a system that makes use of FOL statements that are assumed to be true, with no uncertainty, ambiguity, incorrectness, falsehood, or incompleteness, in other exemplary embodiments, the system may be configured to deal with false statements (whether deliberately false, factually incorrect, or some combination of the two) through optimization. For example, if the system acquires new information that is inconsistent with old information, the new information may be discarded, if desired. (Alternatively, the old information may be discarded, if desired, or some level of "baseline" information may be reverted to. For example, according to one exemplary embodiment, a system may start with a dictionary definition of a term, identify the word as being used in some particular manner when conducting an Internet search or other text data search, and then identify a contradictory usage. In this case, the system may discard both sets of information and roll back to the trusted dictionary definition to ensure accuracy.)

It may also be contemplated that, in some exemplary embodiments, the assumptions that lead to discarding of information may be tracked, as well as the acquisition of information consistent with those assumptions. If a set of assumptions leads to discarding of too much information beyond some limit, contradictory FOL assumptions may be suspended, and new FOL assumptions devised. In certain embodiments, a "limit" may be defined in absolute terms, such that, for example, ten or a hundred contrary uses cause the contradictory FOL assumptions to be suspended. In other exemplary embodiments, a "limit" may be defined in relative terms, such that a number of contrary uses may be observed so long as it does not go over 1% of the total or some other percentage. The system may then be configured to identify an ontology that discards the fewest given assumptions or new information, optionally with such terms being weighted based on a level of certainty or some other valuation such as may be desired; the identified ontology may be selected as an optimal ontology, until or unless it becomes contradicted by other assumptions. (For example, it may be contemplated that a system may weight information that comes from certain sites more highly than others, such that a published article may be treated as being more likely to have used words in a reliable and correct manner, and may be treated as a good source of domain knowledge, while the content harvested from a social media site such as TWITTER may be treated as being less likely to have used words in their proper context. As such, the published article may be weighted more highly and the social media site may be weighted lower. This may mean that, in absolute terms, a more significant number of observations may be associated with the social media site, but the published article may be weighted more highly despite a relatively low number of observations, due to the weighting applied to the source.)

Alternatively, another method of generating an optimal ontology, other than identifying the set of assumptions and theorems that discards the least number of given assumptions or new information, may be used. (For example, as touched on previously, a "base ontology" derived from a dictionary may be generated, and other sources may be assigned reliability scores based on the degree to which data derived from the source matches the ontology generated from the dictionary. A source which produces a very close match may be assigned a high reliability for data not in the dictionary, whereas a source which does not closely match the dictionary data may be assigned a lower reliability, and a higher number of observations or more consistency in the observations may be necessary for data from that source.) This may ensure that it is possible for the weight of evidence to induce a paradigm shift in the FOL assumptions and theorems, even for words that may have common usages contrary to their uses in the dictionary (for example, "literally" or "ironic"), or which may not appear in a dictionary (for example, until recently, "googling" something was a commonly used term for searching that did not appear in the dictionary; this may likewise be the case with other such terms).

As discussed, the automated translation of natural language text into FOL format may allow the generation of ontologies from large amounts of text data. However, it may also be contemplated to employ it for other systems, such as images or video data. In one contemplated exemplary embodiment, it may be contemplated to apply the text ontologies to images or video data in order to assist automated systems in constructing narratives from images and video data. The procedures outlined in this article represent a possible practical means of developing AI systems that can approximate thinking or which even get closer to "strong AI."

In some exemplary embodiments, for example, once an accurate ontology has been generated, the ontology may then be used in a robotic system that may be used to read text or listen to spoken language in such a manner that it can process the text, and generate useful and original responses to a user's input. This may allow the robotic system to respond or reply to the user in a manner based on some level of comprehension of the input sentences, and the application of said input sentences to a logical system based on data stored in a taxonomical format.

In exemplary embodiments of a robotic system, the system may be formed from three main core elements, as are generally described above. A first element may be a natural language processing (NLP) syntactical sentence parser, which may be configured to generate tree structures similar to those discussed above. A second element may be an automated theorem prover (ATP) formatter, which may be used to format the tree structures generated by the NLP syntactical sentence parser into a structure digestible by the ATP software. The third element may be the ATP software itself, which may operate on the formatted tree structures to generate and use the desired ontology. The system may then be coupled to various hardware devices, such as a microphone system configured to receive and interpret the speech of a user, or a text input system, such as a smartphone or other computer system configured to send and receive messages from a server operating the system, or a computer system operating a local copy of the system, or some combination of the two (such as a computer system operating a smaller local copy of the ontology on a local system based on the most commonly used words, and accessing a larger full copy of the ontology on a server based on all available words, or some other set such as all non-obsolete words, such as may be desired).

According to an exemplary embodiment, the system may be configured to converse with human listeners in such a way as to demonstrate some level of human-like understanding. This may distinguish exemplary embodiments of a robotic system from present systems, which may be incapable of comprehension of text, and may instead rely on other devices constructed mostly or entirely by human intervention in order to respond to human queries. For example, it may be contemplated that other devices may be confined entirely to the use of such methods as unprocessed data retrieval from massive databases, or statistical processing of input sentence structures through methods like word frequency counting and n-grams in order to imitate human understanding of sentence subject and sentiment, in order to provide any breadth of application. For reference, "n-grams" describes a process by which statistical processing is performed for text in order to identify word frequencies, after which the co-occurrence of related words and concepts may be identified. From the identification of co-occurrent words and frequencies, co-occurrent words may be identified in appropriate contexts (such as in auto-suggestion programs for use as a typing or text input aid).

Alternatively, other systems and methods in use may be forced to highly constrain the applications in which these systems and methods can be used in order to provide more effective responses in these limited windows of application; for example, some systems and methods may be forced to make use of highly formatted input/output query languages that cannot handle inputs not compatible with these input and output requirements. Other systems and methods may be able to make use of input/output constrained to specific types of questions and answers, which may be effective when answering those highly limited types of questions but may not necessarily be effective under other circumstances. (These may include, for example, robotic speech recognition systems used for customer service in various applications, such as automated billing or menu navigation, automated reservation requesting or check-in for travel such as telephone reservations on trains and the like, and so forth. This may also include, for example, the MICROSOFT COR- TANA, the APPLE SIRI, or the AMAZON ALEXA virtual assistant programs, or any other such programs that may be contemplated.)

It is contemplated that, in exemplary embodiments of a system for integrating ATP and NLP, such features may also be incorporated, if desired. For example, it may be contemplated that, in some circumstances, unprocessed data retrieval or statistical processing of input sentence structures, or any of various approaches that may be used with highly formatted input/output query languages or other forms of constrained input/output, may be quicker or require less processing (or could be more accurate) than the use of an ontology system. As such, it may be contemplated to have an ontology system be used as a fallback system; in one exemplary embodiment of an automated ontology system, the system may be configured to search a database for an existing answer, and, if no existing answer is identified, may be configured to automatically formulate its own answer based on an ontology generated using the ATP software.

In certain embodiments, a different process flow may be contemplated, such as a blend of the two. For example, in response to a particular user query, the query may be processed using NLP and an ATP-based ontology may be used to interpret the query, identifying a topic of interest. An appropriate database may then be searched for a predetermined response to the query. If no predetermined response to the query can be identified, then the system may use either a general-purpose ontology or a topic-specific ontology, such as a legal ontology emulating a legal dictionary, a programming ontology which gives higher weight to programming terminology, and so forth, in order to formulate a response to the query.

According to an exemplary embodiment of an automated ontology system, a system may generally function according to the following principles. As articulated previously, the system may integrate ATP with NLP. The system may then employ formatting methods such as are discussed above in order to translate NLP output into ATP theorems and axioms. The system may make use of new syntactic parsing methods such as previously discussed in order to construct ATP theorems and axioms from text processed by NLP, which may overcome problems like those discussed above as well as numerous others. (For example, according to exemplary embodiments such as those making use of the rules articulated previously, certain problems anticipated to be caused by the combination of ATP and NLP, such as problems associated with recursively constructing ATP theorems from complex sentences.)

The system may also be able to correct numerous problems that may occur when parsing inputs that may not be solvable by present systems. For example, in present systems equipped to perform structured-language parsing techniques (such as compilers and other programs equipped to parse structured programming language), it may be contemplated that non-structured language may present numerous incompatibilities that prevent structured-programming solutions from being employed. Exemplary embodiments of the presently recited system may allow the application of structured-language parsing techniques to non-structured language by dividing input words (which as discussed may be formatted as NLP tree nodes in some exemplary embodiments) into several categories. For example, sentences may be divided into essential characteristics, such as primary subjects, objects, and actions (that is, nouns and verbs), with other words being handled separately. Adjectives and adverbs may be contemplated as being secondary characteristics, which may affect the primary characteristics. Further, the system may, in some exemplary embodiments, contemplate the use of a list of reserved words, such as "if," "then," "else," "or," "and," "not," which may be used to guide construction of first-order logical statements that can be translated into ATP theorems and axioms. This may offer improvements over existing context-free grammar parsers by being able to handle context-sensitive, ambiguous, natural language.

An exemplary embodiment of the present system may be configured to perform the following steps. Prior to response to any user query, the system may obtain a first set of rules defining a knowledge domain, obtain a data file of ingestible information, generate a tree structure based on the ingestible information, and convert the tree structure into at least one tree structure first-order logic axiom. (This may be through NLP if the data is text data; other methods may be contemplated for other types of data, such as image or video data.)

The system may then store a plurality of first-order logic axioms in a memory, this plurality of first-order logic axioms including the at least one tree structure first-order logic axiom. The system may then formulate and test one or more conjectures, the one or more conjectures including a first-order logic axiom not otherwise provided, wherein formulating and testing the one or more conjectures includes generating, based on the plurality of first-order logic axioms, at least one intermediate theorem, and generating, based on the plurality of first-order logic axioms and the at least one intermediate theorem, a conjecture test result, the conjecture test result being an indication that a conjecture in the one or more conjectures is one of true or false. When the conjecture in the one or more conjectures is true, the system may store the conjecture in the memory in the form of an ontology, whereas when the conjecture is false, the system may iterate, formulating and testing one or more additional conjectures and testing those instead. The system may then receive, from an input system, the user query, and may map the user query to the ontology in such a manner as to allow it to be interpreted using the ontology. The system may then generate and output, based on the user query and the ontology, the response to the user query.

In an exemplary embodiment wherein the data is text, the tree structure is a natural language processing (NLP) tree structure representing at least one phrase and comprising a plurality of pairings of syntactic categories and words in the text data. This may also be the case if the data is converted into text using speech-to-text or other such conversion methods. (For example, a separate converter program may be used to identify components of an image, to extract subtitle data from a video, and so forth.)

The step of converting the tree structure into at least one tree structure first-order logic axiom may include steps of identifying a verb in the tree structure, and automatically creating a theorem based on the verb; identifying a subject in the tree structure, and adding it to an object list; identifying a predicate in the tree structure, and adding it to the object list; and providing the theorem as a tree structure first-order logic axiom of the form "verb(object list)." In some exemplary embodiments, modifiers may also be added, such as adverbs and adjectives; in such exemplary embodiments, the step of converting the tree structure into at least one tree structure first-order logic axiom may include steps of identifying a verb in the tree structure, and automatically creating a theorem based on the verb; identifying a subject in the tree structure, and adding it as an object in an object and feature list; identifying a predicate in the tree structure, and adding it as an object in the object and feature list; identifying at least one modifier of at least one of the subject or predicate, and adding the at least one modifier as a feature in the object and feature list in association with the at least one of the subject or predicate; and providing the theorem as a tree structure first-order logic axiom of the form "verb(object and feature list)," wherein the object and feature list includes at least one object-feature pairing (such as "object, feature 1").

In some exemplary embodiments, the system may be configured to automatically further develop the ontology, such as by conducting web searching or by monitoring users. For example, user queries may be shared with other systems or added to a shared ontology. Likewise, it may in some instances be contemplated to record non-query audio data for further processing, if desired.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which:

FIG. 1 is an exemplary flowchart depicting an exemplary embodiment of a process for constructing an ontology for use in an automated ontology system.

FIG. 5 is an exemplary embodiment of computer code depicting an exemplary set of axioms that may be used in a conjecture generation program.

FIG. 6 is an exemplary embodiment of a proof generated by an automated theorem prover according to an exemplary embodiment of the present system.

DETAILED DESCRIPTION

Figure 2:
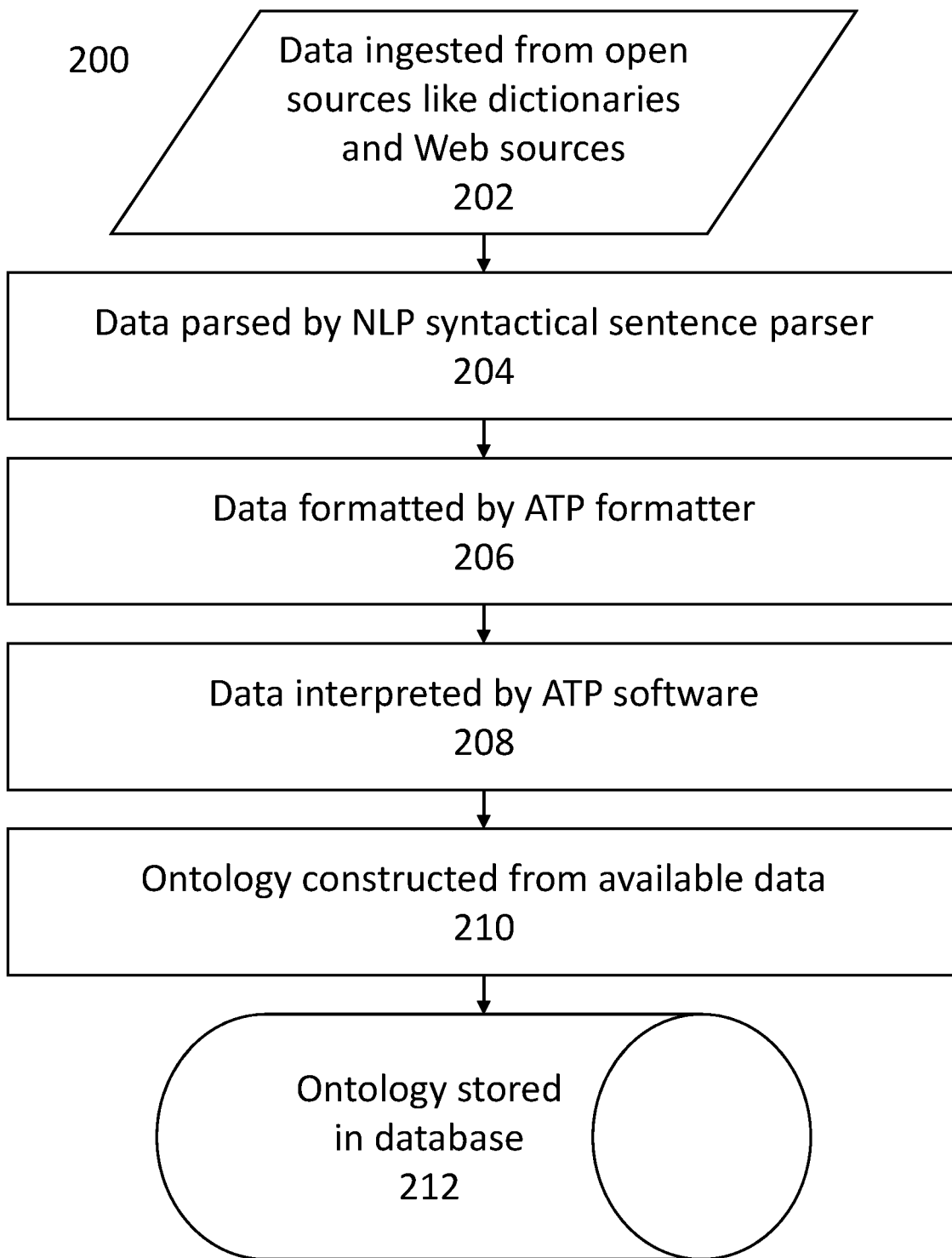
FIG. 2 is an exemplary flowchart depicting an exemplary embodiment of a process for constructing an ontology for use in an automated ontology system.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

According to an exemplary embodiment, and referring generally to the Figures, various exemplary implementations of an automated ontology system may be disclosed.

Turning now to exemplary FIG. 1, FIG. 1 is an exemplary flowchart depicting an exemplary embodiment of a process for constructing an ontology for use in an automated ontology system 100. According to an exemplary embodiment, in a first step 102, a knowledge domain may be formed through ontological engineering. In a second step 104, information may be ingested from a set of sources, such as through dictionaries, higher-quality or professional sources such as published literature or published scholarly articles, or through open-ended web searching (or any other method of information ingestion such as may be desired). Information ingestion may be completely automatic (for example, automatic web crawling), if desired; alternatively, one or more sources may be provided manually, and may be given greater priority or greater weight if desired. In a third step 106, the ingested information may be transformed into a set of rule-based structures. In a fourth step 108, the system may perform conjecture generation to generate one or more conjectures. In a fifth step 110, the system may perform hypothesis testing in order to generate the ontology based on the resolution of the hypothesis testing. For example, according to an exemplary embodiment, the system may iterate through a variety of hypotheses, checking them against the collected data and refining them as appropriate through successive conjecture generation 108 and hypothesis testing 110 steps. Once the generated hypotheses are all tested and resolved to a desired level of accuracy, the system may indicate that an ontology has been successfully generated based on the generated conjectures 108, and the ontology may be available for future use. Alternatively, if the system cannot reconcile its conjectures through hypothesis testing 110, the system may collect more data by ingesting information from additional open sources 104 until the hypotheses can be resolved one way or the other. (For example, additional searching may cause the system to identify additional data sources that its trustworthiness criteria indicate should be weighted more highly, such as additional dictionaries or scholarly articles, and the weight of the additional data may push certain hypotheses above a desired probability threshold. In another exemplary embodiment, additional searching may lead to old data being reevaluated and discarded in favor of the new data. Other such variants may also be contemplated, such as may be desired.)

Turning now to exemplary FIG. 2, FIG. 2 is an exemplary flowchart depicting an exemplary embodiment of a process for constructing an ontology for use in an automated ontology system 200. According to an exemplary embodiment, data may be ingested and transformed into an ontology according to the following structural diagram. First, data may be ingested 202 from one or more sources, which may be open sources like dictionaries or Web sources, or may be more directed (e.g. just dictionaries, just digitized books, just digitized books from a certain date range, and so forth). Next, data may be parsed 204 using a syntactical sentence parser, and may then be formatted 206 using a formatter configured to properly format the data in ATP format as discussed previously. The data may then be interpreted 208 by the ATP software in order to determine a set of hypotheses which are considered to have been proven, above a desired level of certainty. An ontology may then be generated from the solved hypotheses 210. This ontology may be stored in a database 212.

According to an exemplary embodiment, NLP output from the NLP syntactical sentence parser 204 may be formatted as a tree formed from nodes made from the words in the sentence, which may graph the syntactic dependency based on the Penn Treebank format. That is, words may be designated as nouns, verbs, and other parts of speech, and the sentence may be parsed as a recursive graph structure that maps the grammatical dependency of subjects and predicates.

Such a system may overcome existing problems with automated systems that prevent them from extracting more than superficial conceptual information from NLP output. This may be due to several issues, each overcome by the present system, following a process such as that described in FIG. 2.

First, existing automated systems may have no framework for incorporating prior contextual information. Lacking such information may cause them to struggle even with basic matters of interpretation, such as dictionary referencing and retrieval. For any given object, it may be understood that human beings, or another group of which the expected user may be a part (such as, for example, "English speakers" or "Americans") may have a framework of prior understanding of the concept which machine learning systems lack, and which, because of the commonality of such understanding among human beings or other expected users, may not be explicitly incorporated into reference material.

Second, NLP output is incompatible for ingesting into existing taxonomies, or ontological structures, simply because of incompatibilities in the data structures that must be resolved.

Third, and potentially most crucially, existing systems have no method of inferring cause or consequence, generating conjectures, or reasoning. This means that existing systems have no real ability to interpret data other than based on predetermined questions and answers in a database or statistical word matching.

The so-called "Chinese room" thought experiment essentially describes the most capable existing systems. In this thought experiment, a monolingual English speaker is locked in a room, and given a large batch of Chinese writing, plus a second batch of Chinese script and a set of rules in English for directly correlating the second batch with the first batch. The rules correlate one set of formal symbols (i.e. the symbols are identified by their form or shape, also called "syntactic" symbols) with another set of formal symbols. A third batch of Chinese symbols and more instructions in English enable the English speaker to correlate elements of this third batch of Chinese symbols with elements of the first two batches and instruct the English speaker, thereby, to give back certain sorts of Chinese symbols with certain sorts of shapes in response. Regardless of the performance of the system, it can brook no deviations from protocol and cannot handle any situations not defined by the English instructions. At best, when given a new symbol, the system may be able to discover a proper response through trying symbols at random and determining which are and are not acceptable.

The present system provides a framework for harnessing an automated theorem prover to generate logical consequences from input statements, and test the validity of conjectures. As discussed, ATP has been used to test hardware systems and prove the truth and soundness of theorems. ATP systems can provide an underlying framework for an AI system that understands and responds to spoken or written statements translated into the proper format. However, ATP systems require precise, highly formatted input (based on predicate calculus). The remainder of the system provides a reliable method of generating that input from natural language, which is often ambiguous and imprecise.

For example, one format suitable for ATP is the following format: "Theorem_name (Object1, Object2, Object3, . . . , ObjectN)." In this nomenclature, "Theorem_name" may correspond to the verb of a sentence or phrase, and "Object1" and "Object2," etc., may correspond to subject and predicate of a sentence. This strategy is easy to implement and has been tested for simple sentences. For complex sentences, the strategy is implemented recursively; for example, Object1 and Object 2 may themselves be phrases that can be reduced to the same semantic structure. According to such an exemplary embodiment, they may be folded into tree structures which would be tokenized (labeled as separate entities), and ingested as axioms into the system.

As touched on previously, the presence of modifiers such as adjectives and adverbs complicates this procedure. Part of the difficulty of parsing natural language is determining whether the modifiers are essential, or whether the qualities are circumstantial and accidental. Exemplary embodiments described herein address the problem by introducing an alternative theorem structure, "Theorem_name(Object1, Feature1-1, Feature1-2, . . . , Object2, Feature2-1, Feature2-2, . . . )," which likewise may be extensible as necessary to include as many features and as many objects as desired. Such structure ensures that secondary characteristics can be accounted for in such a manner as to allow the axiom database to be searchable and functional at the same time.

As also touched on previously, as noted, in some contemplated exemplary embodiments, conditional language expressions such as "if" and "else" phrases may not be literally reducible to a theorem structure such as is contemplated above. Therefore, in some exemplary embodiments, a parsing algorithm may be introduced, which may be operable to build axiom expressions from the phrases in which these terms appear. For example, the statement "if A is a snake, A is a reptile" would be parsed into a standard first-order logic theorem structure as "-snake(A)|reptile(A)." (As previously explained, such a statement would literally equate to "one of these is true: A is not a snake, OR A is a reptile." Both, of course, can be true; something can be a turtle, for example, and be both not a snake and a reptile. In such a circumstance, the statement will remain true. The same is true for other such statements, like "-parent(x,y) |ancestor(x,y)," where something can be both not a parent and an ancestor, such as a grandparent.) That is, the parsing of the reserved word "if" leads to the construction of a phrase which can be directly ingested into ATP, and which implements logic analogous to program branching. This strategy allows human natural language, with its high degree of ambiguity and context sensitivity, to be treated in a manner essentially akin to a structured computer language, allowing for the automation of a large number of tasks that could not be previously automated.

As such, as best understood, exemplary embodiments of the present system may operate to allow a robot to converse with human beings with understanding comparable to human comprehension. For example, according to an exemplary embodiment, a robot implementing a system such as the current system and which has generated (or which has access to) an appropriate ontology 212 may be asked highly detailed questions about subject matter in text, in such a manner as to enable the robot to respond in such a way as to demonstrate understanding as opposed to repeating back the literal text material, or searching a database for specific terms. Existing query and human interface systems are unable to conjecture, reason, or hypothesize, and can only respond to humans in simplistic ways. This is made possible by the processing of natural language into a format compatible with ATP, such that the stored information is represented as theorems and axioms, as opposed to XML and HTML web pages (such as might be retrieved as part of internet searching), and databases and class structures implemented in other languages. As such, data from outside sources can be rapidly ingested. In some exemplary embodiments, for example, web crawler programs may function to access web pages automatically, and ingest information from across the internet, demonstrating a level of comprehension and resilient concept-forming capability unavailable to robotic query systems today.

Figure 3:
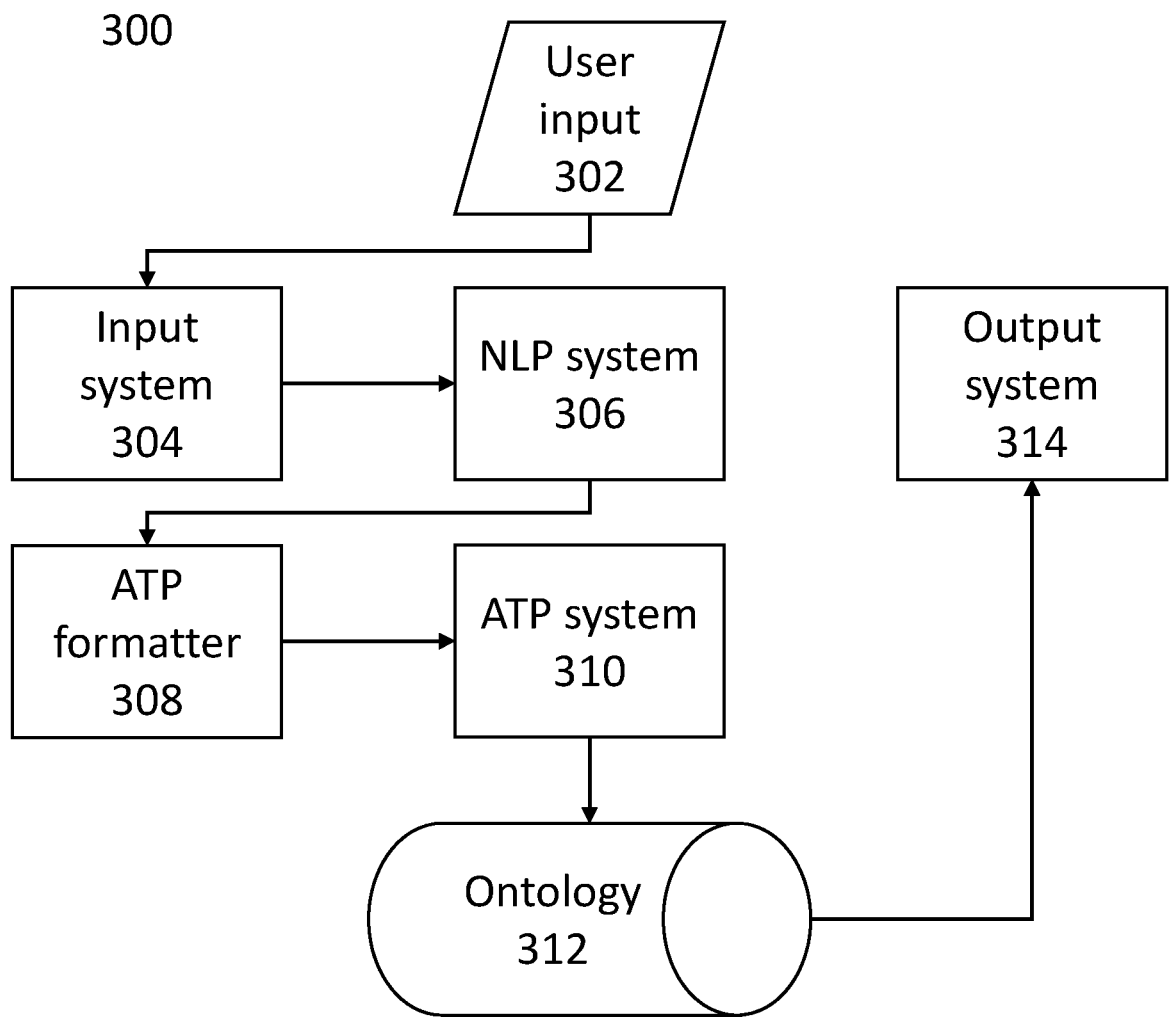
FIG. 3 is an exemplary flowchart depicting an exemplary embodiment of a process for constructing and using an ontology with an automated ontology system.

Turning now to exemplary FIG. 3, FIG. 3 provides an exemplary flowchart depicting an exemplary embodiment of a process for constructing and using an ontology with an automated ontology system 300. In a first step, a user may provide input 302, which may be interpreted by an input system 304, such as a microphone for spoken language, a messaging system for messages provided by email, text message, and the like, or any other input system such as may be desired. (In some exemplary embodiments, non-text inputs, such as photographs or video, and/or non-text outputs may also be contemplated. For example, according to an exemplary embodiment, a system may be employed as an instrumental musical composition system, with data provided to the system being audio tracks, and system outputs being composed sets of music based on some defining criteria provided as an input. Such a system may be used to, for example, automatically generate a background track for a movie trailer or other such video clip.)

The user input may be provided to a NLP system 306. (In some exemplary embodiments, such as if the system is configured to provide image inputs or outputs, the NLP system 306 may be another interpretation system appropriate to the content in question, such as may be desired.) The NLP system 306 may parse the provided data, as a first step of determining whether the user has provided a request to the system, and, if so, what the user has requested and what response is appropriate. The parsed data may then be provided to an ATP formatter 308 and matched against the ontology 312.

In some exemplary embodiments, the parsed data may be matched against the ontology 312 by an ATP system 310, which may also use the user query or other user statement to continue to build the ontology 312, if desired. In certain exemplary embodiments, it may be contemplated to have ontologies that are adjusted based on particular users and their queries, responses, and so forth over time; this may be used to train the system to do such things as interpret regional variations in speech that are used by the user or other similar users but would not have the same recognized meanings to other users. For example, "soda," "pop," and "COKE" may have different meanings depending on the locale or depending on the user, which may be used to specifically tailor the ontology.

Once the system 310 has matched a user query against the ontology 312 or has otherwise interpreted the user input 302, the system 310 may generate an output via an output system 314. For example, according to an exemplary embodiment, once the system has determined how to properly respond to a user statement, the system may generate a response to the user statement according to some criteria, which may for example be an audio output (such as an answer to a user question), a textual output (such as, again, an answer to a user question, in this case provided via textual message), an electronic output such as controlling a particular device (for example, the system may instruct a particular device to turn on or off, or perform certain commands such as changing a speed of a controllable motor, changing a temperature of an environment, changing the channel on a TV, and so on and so forth), or any other output such as may be desired.

Various formats of input and output may be contemplated, and in some exemplary embodiments may not be confined to the same format. To briefly explore one example, according to an exemplary embodiment, a user may be able to instruct the system to "write a 'thank you' message to my guest." The system may interpret "guest" in such a manner that it retrieves a calendar of a user and retrieves a record for a "visitor" who visited in the past hour, equates the two terms, and generates an automated "thank you" message based on a template. This may then be output to the user for final review.

Figure 4:
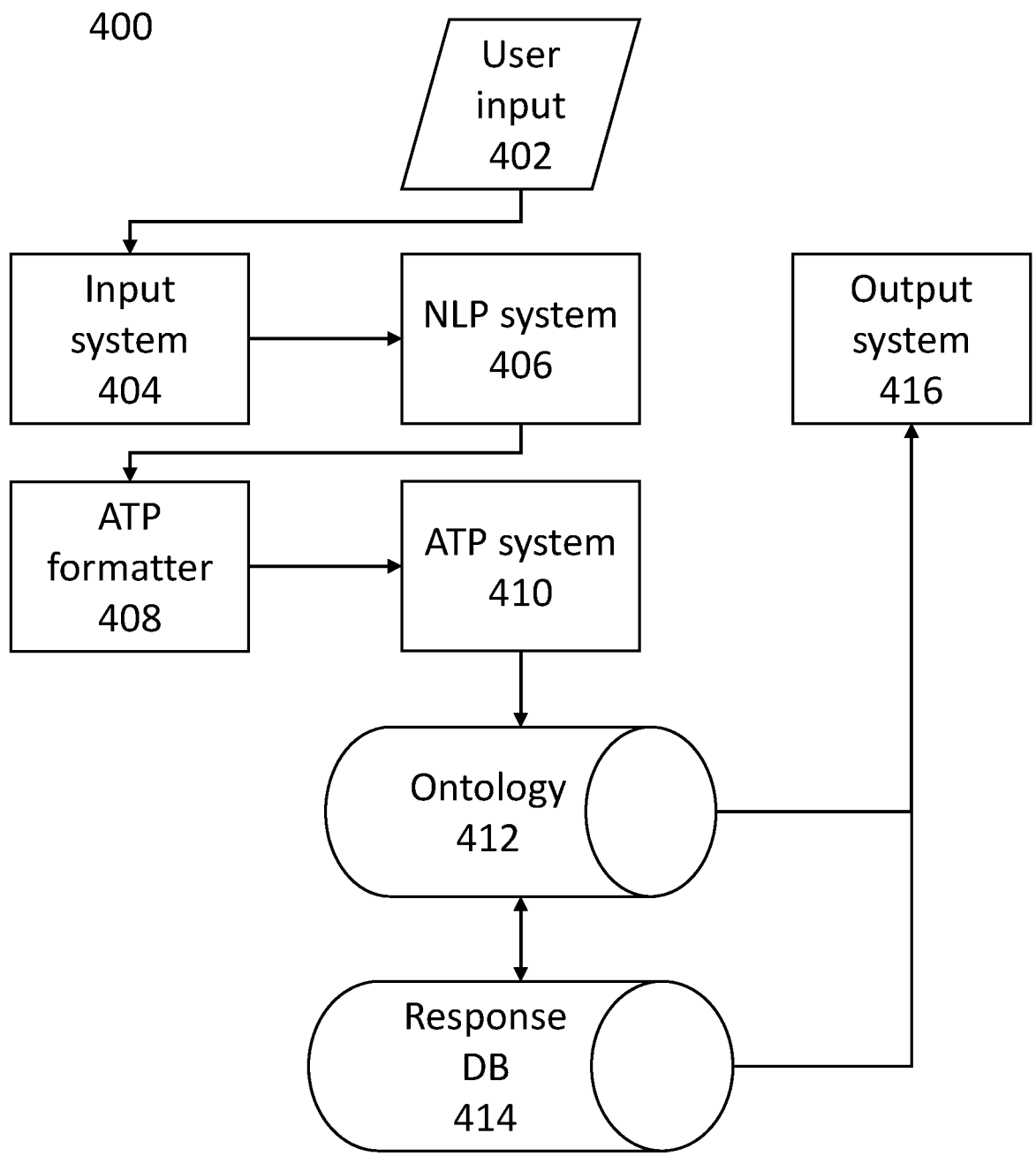
FIG. 4 is an exemplary flowchart depicting an exemplary embodiment of a process for constructing and using an ontology with an automated ontology system.

Turning now to exemplary FIG. 4, FIG. 4 is an exemplary flowchart depicting an exemplary embodiment of a process for constructing and using an ontology with an automated ontology system 400. According to an exemplary embodiment, a user may provide a user input 402, may have the input 402 interpreted through an input system 404, processed using a NLP system 406 or similar system (for example, for non-text inputs), provided to an ATP formatter 408, provided to an ATP system 410, and provided to an ontology 412. In FIG. 4, however, it may be contemplated that the system may be controlled to respond in particular ways, based on predetermined outputs saved in a response database 414, to particular questions, regardless of the exact wording of those questions. As such, the system may use the ontology 412 to interpret a query of a user, and, if the query matches a query in the response database 414, a saved response may be output via an output system 416. Otherwise, the system may use the ontology 412 to generate a response, which may then be provided via the output system 416.

Turning now to exemplary FIG. 5, FIG. 5 depicts an exemplary embodiment of a set of computer code depicting an exemplary set of axioms that may be used in a conjecture generation program 500. According to an exemplary embodiment, the computer code may define a set of conjectures, including a first set of general linguistic rules 502 and a second set of relationship data 504. According to an exemplary embodiment, such general linguistic rules 502 and relationship data 504 may each be provided as axioms initially, and, as new theorems are proven, they may automatically be added to the represented knowledge base. For example, as provided therein, the general linguistic rules 502 may be, for example, a rule that a "parent" is an ancestor, a rules that a "mother" is a parent, a rule that a "father" is a parent, and so forth. Other rules may be, for example, a rule that a "mother(x, offspring)" may be a "girl(x)," and so forth.

Likewise, various other inputs, in this case characterizing relationship data to be analyzed 504, may be added. This may define, for example, that "Gaia" is a "girl," that "Cronus" is a "boy," that "Gaia" is the "mother(x, offspring)" of "Cronus" (such that "mother (Gaia, Cronus)" is true), and so forth. This system may then be solved by the ATP program in a simple demonstration analogous to the generation of an ontology such as has been previously referenced. The system may also define that its goals 506 are to generate a complete set of formulas, such that the status of each deity defined in the relationship data is fully characterized.

Turning now to exemplary FIG. 6, FIG. 6 displays an exemplary embodiment of a proof 600 generated by an automated theorem prover according to an exemplary embodiment of the present system. In an exemplary embodiment, the proof 600 may track the progress of the automated theorem prover and may demonstrate how the automated theorem prover came to its conclusions. For example, according to an exemplary embodiment, the proof may establish that "Apollo" is the "greatgrandson(x,y)" of "Gaia" based on the below lines. This conjecture may be provided, in line 2, as a goal, which the system may then try to resolve. The system may begin with the assumption that a "mother (x,y)" is a "parent(x,y)," and then interpret the relationship data based on the assumption that Gaia is the mother of Cronus ("mother(Gaia,Cronus)"). The system may then take into account the other assumptions, determining that Cronus is the father of Zeus, and that Zeus is the father of Apollo, as well as all the other linguistic assumptions. The system may then use this data in order to establish that "-parent(x,y)|greatgrandparent(z,y)|-parent(z,u)|-parent(u,x)." That is, at least one of the set of the following must be true: "X being the parent of Y is not true;" "Z being the great-grandparent of Y is true," "Z being the parent of U is not true," or "U being the parent of X is not true," such that if each of the "parent" statements are true (making X the parent of Y, U the parent of X, and Z the parent of U) Z may therefore be the great-grandparent of Y. As such, in order to resolve that Gaia is the great-grandparent of Apollo, it may be resolved that Gaia is the parent of Cronus (based on assumptions in line 4 and 8), that Cronus is the parent of Zeus, that Zeus is the parent of Apollo, and that therefore the above relation can be solved with Gaia being the great-grandparent of Apollo. The goal is thus reached, and the proof shows that Apollo is the great-grandson of Gaia. The same method may be used in order to resolve any of the other relationships, such as, for example, Cronus being the grandparent of Apollo, such as may be desired. Such a system may also work on more complex data sets, with more complex logic, operating according to the same principles or according to similar principles, such as may be desired.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for automatically generating a response to a user query, comprising:
obtaining a first set of rules defining a knowledge domain;
obtaining a data file of ingestible information;
with a processor, generating a tree structure based on the ingestible information, and converting the tree structure into at least one tree structure first-order logic axiom;
storing a plurality of first-order logic axioms in a memory, the plurality of first-order logic axioms comprising the at least one tree structure first-order logic axiom;
with the processor, parsing further extrinsic information and formulating and testing one or more conjectures based on the further extrinsic information, the one or more conjectures comprising a first-order logic axiom, wherein formulating and testing the one or more conjectures comprises generating, based on a combination of at least two of the plurality of first-order logic axioms, at least one intermediate theorem, and generating, based on the plurality of first-order logic axioms and the at least one intermediate theorem, a conjecture test result, the conjecture test result being an indication that a conjecture in the one or more conjectures is one of true or false;
when the conjecture in the one or more conjectures is true, storing the conjecture in the memory in the form of an ontology;
when the conjecture is false, formulating and testing one or more additional conjectures;
receiving, from an input system, the user query;
with the processor, mapping the user query to the ontology; and
generating, based on the user query and the ontology, the response to the user query.

2. The method of claim 1, wherein the data file of ingestible information comprises text data; and
wherein the tree structure is a natural language processing (NLP) tree structure representing at least one phrase and comprising a plurality of pairings of syntactic categories and words in the text data.

3. The method of claim 2, wherein the step of converting the tree structure into at least one tree structure first-order logic axiom comprises:
identifying a verb in the tree structure, and automatically creating a theorem based on the verb;
identifying a subject in the tree structure, and adding it to an object list;
identifying a predicate in the tree structure, and adding it to the object list; and
providing the theorem as a tree structure first-order logic axiom of the form "verb(object list)."

4. The method of claim 2, wherein the step of converting the tree structure into at least one tree structure first-order logic axiom comprises:
identifying a verb in the tree structure, and automatically creating a theorem based on the verb;
identifying a subject in the tree structure, and adding it as an object in an object and feature list;
identifying a predicate in the tree structure, and adding it as an object in the object and feature list;
identifying at least one modifier of at least one of the subject or predicate, and adding the at least one modifier as a feature in the object and feature list in association with the at least one of the subject or predicate; and providing the theorem as a tree structure first-order logic axiom of the form "verb(object and feature list)," wherein the object and feature list comprises at least one object-feature pairing.

5. The method of claim 1, wherein the data file of ingestible information comprises at least one of audio data, image data, or video data.

6. The method of claim 1, wherein the method further comprises mapping, with the processor, the speech data to text data; and
wherein the tree structure is a natural language processing (NLP) tree structure comprising a plurality of pairings of syntactic categories and words in the text data.

7. The method of claim 1, wherein the user query is added to the data file of ingestible information.

8. The method of claim 1, wherein the method further comprises:
conducting, with the processor and via a network connection, at least one automated web search, and retrieving content from at least one web page; and
adding the content to the data file of ingestible information.

9. An automated ontology system configured to automatically generate a response to a user query, the system comprising an input system, an output system, a processor, and a memory, wherein the system is configured to perform the steps of:
obtaining a first set of rules defining a knowledge domain;
obtaining a data file of ingestible information;
with the processor, generating a tree structure based on the ingestible information, and converting the tree structure into at least one tree structure first-order logic axiom;
storing a plurality of first-order logic axioms in the memory, the plurality of first-order logic axioms comprising the at least one tree structure first-order logic axiom;
with the processor, parsing further extrinsic information and formulating and testing one or more conjectures based on the further extrinsic information, the one or more conjectures comprising a first-order logic axiom, wherein formulating and testing the one or more conjectures comprises generating, based on a combination of at least two of the plurality of first-order logic axioms, at least one intermediate theorem, and generating, based on the plurality of first-order logic axioms and the at least one intermediate theorem, a conjecture test result, the conjecture test result being an indication that a conjecture in the one or more conjectures is one of true or false;
when the conjecture in the one or more conjectures is true, storing the conjecture in the memory in the form of an ontology;
when the conjecture is false, formulating and testing one or more additional conjectures;
receiving, from the input system, the user query;
with the processor, mapping the user query to the ontology; and
generating, based on the user query and the ontology, the response to the user query, and outputting the response to the user query via the output system.

10. The system of claim 9, wherein the data file of ingestible information comprises text data; and
wherein the tree structure is a natural language processing (NLP) tree structure representing at least one phrase and comprising a plurality of pairings of syntactic categories and words in the text data.

11. The system of claim 10, wherein the step of converting the tree structure into at least one tree structure first-order logic axiom comprises:
identifying a verb in the tree structure, and automatically creating a theorem based on the verb;
identifying a subject in the tree structure, and adding it to an object list;
identifying a predicate in the tree structure, and adding it to the object list; and
providing the theorem as a tree structure first-order logic axiom of the form "verb(object list)."

12. The system of claim 10, wherein the step of converting the tree structure into at least one tree structure first-order logic axiom comprises:
identifying a verb in the tree structure, and automatically creating a theorem based on the verb;
identifying a subject in the tree structure, and adding it as an object in an object and feature list;
identifying a predicate in the tree structure, and adding it as an object in the object and feature list;
identifying at least one modifier of at least one of the subject or predicate, and adding the at least one modifier as a feature in the object and feature list in association with the at least one of the subject or predicate; and
providing the theorem as a tree structure first-order logic axiom of the form "verb(object and feature list)," wherein the object and feature list comprises at least one object-feature pairing.

13. The system of claim 9, wherein the data file of ingestible information comprises at least one of audio data, image data, or video data.

14. The system of claim 9, wherein the system is further configured to map, with the processor, the speech data to text data; and
wherein the tree structure is a natural language processing (NLP) tree structure comprising a plurality of pairings of syntactic categories and words in the text data.

15. The system of claim 9, wherein the system is further configured to add the user query to the data file of ingestible information.

16. The system of claim 9, wherein the system is further configured to:
conduct, with the processor and via a network connection, at least one automated web search, and retrieve content from at least one web page; and
adding the content to the data file of ingestible information.

17. A non-transitory computer-readable medium comprising computer program code that, when executed, causes a computer system comprising an input system, an output system, a processor, and a memory to perform the steps of:
obtaining a first set of rules defining a knowledge domain;
obtaining a data file of ingestible information;
with the processor, generating a tree structure based on the ingestible information, and converting the tree structure into at least one tree structure first-order logic axiom;
storing a plurality of first-order logic axioms in the memory, the plurality of first-order logic axioms comprising the at least one tree structure first-order logic axiom;
with the processor, parsing further extrinsic information and formulating and testing one or more conjectures based on the further extrinsic information, wherein formulating and testing the one or more conjectures comprises generating, based on a combination of at least two of the plurality of first-order logic axioms, at least one intermediate theorem, and generating, based on the plurality of first-order logic axioms and the at least one intermediate theorem, a conjecture test result, the conjecture test result being an indication that a conjecture in the one or more conjectures is one of true or false;

when the conjecture in the one or more conjectures is true, storing the conjecture in the memory in the form of an ontology;

when the conjecture is false, formulating and testing one or more additional conjectures;

receiving, from the input system, the user query;

with the processor, mapping the user query to the ontology; and generating, based on the user query and the ontology, the response to the user query, and outputting the response to the user query via the output system.

18. The non-transitory computer-readable medium of claim 17, wherein the data file of ingestible information comprises text data; and
wherein the tree structure is a natural language processing (NLP) tree structure representing at least one phrase and comprising a plurality of pairings of syntactic categories and words in the text data.

19. The non-transitory computer-readable medium of claim 18, wherein the step of converting the tree structure into at least one tree structure first-order logic axiom comprises:

identifying a verb in the tree structure, and automatically creating a theorem based on the verb;

identifying a subject in the tree structure, and adding it to an object list;

identifying a predicate in the tree structure, and adding it to the object list; and providing the theorem as a tree structure first-order logic axiom of the form "verb(object list)."

20. The non-transitory computer-readable medium of claim 18, wherein the step of converting the tree structure into at least one tree structure first-order logic axiom comprises:

identifying a verb in the tree structure, and automatically creating a theorem based on the verb;

identifying a subject in the tree structure, and adding it as an object in an object and feature list;

identifying a predicate in the tree structure, and adding it as an object in the object and feature list;

identifying at least one modifier of at least one of the subject or predicate, and adding the at least one modifier as a feature in the object and feature list in association with the at least one of the subject or predicate; and providing the theorem as a tree structure first-order logic axiom of the form "verb(object and feature list)," wherein the object and feature list comprises at least one object-feature pairing.

* * * * *